(12) United States Patent
Goodsitt et al.

(10) Patent No.: US 12,405,844 B2
(45) Date of Patent: *Sep. 2, 2025

(54) SYSTEMS AND METHODS FOR SYNTHETIC DATABASE QUERY GENERATION

(71) Applicant: CAPITAL ONE SERVICES, LLC, McLean, VA (US)

(72) Inventors: Jeremy Goodsitt, Champaign, IL (US); Austin Walters, Savoy, IL (US); Vincent Pham, Champaign, IL (US); Fardin Abdi Taghi Abad, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/050,694

(22) Filed: Oct. 28, 2022

(65) Prior Publication Data

US 2023/0073695 A1    Mar. 9, 2023

Related U.S. Application Data

(63) Continuation of application No. 16/298,463, filed on Mar. 11, 2019, now Pat. No. 11,513,869.
(Continued)

(51) Int. Cl.
    *G06N 20/00*    (2019.01)
    *G06F 8/71*     (2018.01)
    (Continued)

(52) U.S. Cl.
    CPC ............... *G06F 9/541* (2013.01); *G06F 8/71* (2013.01); *G06F 9/54* (2013.01); *G06F 9/547* (2013.01);
    (Continued)

(58) Field of Classification Search
    CPC ........ G06F 9/541; G06F 30/20; G06F 40/117; G06F 40/166; G06F 40/20; G06F 8/71;
    (Continued)

(56) References Cited

U.S. PATENT DOCUMENTS

| 5,911,139 A | 6/1999 | Jain et al. |
| 5,974,549 A | 10/1999 | Golan |

(Continued)

OTHER PUBLICATIONS

Park et al., Data Synthesis based on Generative Adversarial Networks, vol. 11 No. 10, Jul. 2018. (Year: 2018).*

(Continued)

*Primary Examiner* — Marshall L Werner
(74) *Attorney, Agent, or Firm* — Foley & Lardner LLP

(57) ABSTRACT

A system for returning synthetic database query results. The system may include a memory unit for storing instructions, and a processor configured to execute the instructions to perform operations comprising: receiving a query input by a user at a user interface; determining, based on natural language processing, a type of the query input; determining, based on the received query input and a database language interpreter, an output data format; returning, based on a generation model and the output data format, a result of the query input; providing, to a plurality of training models and based on the determined query type, the query input and the result; and training the training models, based on the query input and the result.

20 Claims, 17 Drawing Sheets

Related U.S. Application Data

(60) Provisional application No. 62/694,968, filed on Jul. 6, 2018.

(51) Int. Cl.

| | | |
|---|---|---|
| G06F 9/54 | (2006.01) | |
| G06F 11/3604 | (2025.01) | |
| G06F 11/362 | (2025.01) | |
| G06F 16/22 | (2019.01) | |
| G06F 16/242 | (2019.01) | |
| G06F 16/2455 | (2019.01) | |
| G06F 16/248 | (2019.01) | |
| G06F 16/25 | (2019.01) | |
| G06F 16/28 | (2019.01) | |
| G06F 16/335 | (2019.01) | |
| G06F 16/903 | (2019.01) | |
| G06F 16/9032 | (2019.01) | |
| G06F 16/9038 | (2019.01) | |
| G06F 16/906 | (2019.01) | |
| G06F 16/93 | (2019.01) | |
| G06F 17/15 | (2006.01) | |
| G06F 17/16 | (2006.01) | |
| G06F 17/18 | (2006.01) | |
| G06F 18/20 | (2023.01) | |
| G06F 18/21 | (2023.01) | |
| G06F 18/2115 | (2023.01) | |
| G06F 18/213 | (2023.01) | |
| G06F 18/214 | (2023.01) | |
| G06F 18/22 | (2023.01) | |
| G06F 18/23 | (2023.01) | |
| G06F 18/24 | (2023.01) | |
| G06F 18/2411 | (2023.01) | |
| G06F 18/2415 | (2023.01) | |
| G06F 18/40 | (2023.01) | |
| G06F 21/55 | (2013.01) | |
| G06F 21/60 | (2013.01) | |
| G06F 21/62 | (2013.01) | |
| G06F 30/20 | (2020.01) | |
| G06F 40/117 | (2020.01) | |
| G06F 40/166 | (2020.01) | |
| G06F 40/20 | (2020.01) | |
| G06N 3/04 | (2023.01) | |
| G06N 3/044 | (2023.01) | |
| G06N 3/045 | (2023.01) | |
| G06N 3/06 | (2006.01) | |
| G06N 3/08 | (2023.01) | |
| G06N 3/088 | (2023.01) | |
| G06N 3/094 | (2023.01) | |
| G06N 5/00 | (2023.01) | |
| G06N 5/02 | (2023.01) | |
| G06N 5/04 | (2023.01) | |
| G06N 7/00 | (2023.01) | |
| G06N 7/01 | (2023.01) | |
| G06Q 10/04 | (2023.01) | |
| G06T 7/194 | (2017.01) | |
| G06T 7/246 | (2017.01) | |
| G06T 7/254 | (2017.01) | |
| G06T 11/00 | (2006.01) | |
| G06V 10/70 | (2022.01) | |
| G06V 10/98 | (2022.01) | |
| G06V 30/194 | (2022.01) | |
| G06V 30/196 | (2022.01) | |
| H04L 9/40 | (2022.01) | |
| H04L 67/00 | (2022.01) | |
| H04L 67/306 | (2022.01) | |
| H04N 21/234 | (2011.01) | |
| H04N 21/81 | (2011.01) | |

(52) U.S. Cl.
CPC ...... *G06F 11/3608* (2013.01); *G06F 11/3628* (2013.01); *G06F 11/3636* (2013.01); *G06F 16/2237* (2019.01); *G06F 16/2264* (2019.01); *G06F 16/2423* (2019.01); *G06F 16/24568* (2019.01); *G06F 16/248* (2019.01); *G06F 16/254* (2019.01); *G06F 16/258* (2019.01); *G06F 16/283* (2019.01); *G06F 16/285* (2019.01); *G06F 16/288* (2019.01); *G06F 16/335* (2019.01); *G06F 16/90332* (2019.01); *G06F 16/90335* (2019.01); *G06F 16/9038* (2019.01); *G06F 16/906* (2019.01); *G06F 16/93* (2019.01); *G06F 17/15* (2013.01); *G06F 17/16* (2013.01); *G06F 17/18* (2013.01); *G06F 18/2115* (2023.01); *G06F 18/213* (2023.01); *G06F 18/214* (2023.01); *G06F 18/2148* (2023.01); *G06F 18/217* (2023.01); *G06F 18/2193* (2023.01); *G06F 18/22* (2023.01); *G06F 18/23* (2023.01); *G06F 18/24* (2023.01); *G06F 18/2411* (2023.01); *G06F 18/2415* (2023.01); *G06F 18/285* (2023.01); *G06F 18/40* (2023.01); *G06F 21/552* (2013.01); *G06F 21/60* (2013.01); *G06F 21/6245* (2013.01); *G06F 21/6254* (2013.01); *G06F 30/20* (2020.01); *G06F 40/117* (2020.01); *G06F 40/166* (2020.01); *G06F 40/20* (2020.01); *G06N 3/04* (2013.01); *G06N 3/044* (2023.01); *G06N 3/045* (2023.01); *G06N 3/06* (2013.01); *G06N 3/08* (2013.01); *G06N 3/088* (2013.01); *G06N 3/094* (2023.01); *G06N 5/00* (2013.01); *G06N 5/02* (2013.01); *G06N 5/04* (2013.01); *G06N 7/00* (2013.01); *G06N 7/01* (2023.01); *G06N 20/00* (2019.01); *G06Q 10/04* (2013.01); *G06T 7/194* (2017.01); *G06T 7/246* (2017.01); *G06T 7/248* (2017.01); *G06T 7/254* (2017.01); *G06T 11/001* (2013.01); *G06V 10/768* (2022.01); *G06V 10/993* (2022.01); *G06V 30/194* (2022.01); *G06V 30/1985* (2022.01); *H04L 63/1416* (2013.01); *H04L 63/1491* (2013.01); *H04L 67/306* (2013.01); *H04L 67/34* (2013.01); *H04N 21/23412* (2013.01); *H04N 21/8153* (2013.01); *G06T 2207/10016* (2013.01); *G06T 2207/20081* (2013.01); *G06T 2207/20084* (2013.01)

(58) Field of Classification Search
CPC ........ G06F 9/54; G06F 9/547; G06F 11/3608; G06F 11/3628; G06F 11/3636; G06F 17/15; G06F 17/16; G06F 17/18; G06F 21/552; G06F 21/60; G06F 21/6245; G06F 21/6254; G06F 18/2115; G06F 18/213; G06F 18/214; G06F 18/2148; G06F 18/217; G06F 18/2193; G06F 18/22; G06F 18/23; G06F 18/24; G06F 18/2411; G06F 18/2415; G06F 18/285; G06F 18/40; G06F 16/2237; G06F 16/2264; G06F 16/2423; G06F 16/24568; G06F 16/248; G06F 16/254; G06F 16/258; G06F 16/283; G06F 16/285; G06F 16/288; G06F 16/335; G06F 16/90332; G06F 16/90335; G06F 16/9038; G06F 16/906; G06F 16/93; G06N 20/00; G06N 7/00; G06N 7/01;

G06N 5/00; G06N 5/02; G06N 5/04;
G06N 3/04; G06N 3/044; G06N 3/045;
G06N 3/06; G06N 3/08; G06N 3/088;
G06T 7/194; G06T 7/246; G06T 7/248;
G06T 7/254; G06T 11/001; G06T
2207/10016; G06T 2207/20081; G06T
2207/20084; G06V 30/194; G06V
30/1985; G06V 10/768; G06V 10/993;
G06Q 10/04; H04L 63/1416; H04L
63/1491; H04L 67/306; H04L 67/34;
H04N 21/23412; H04N 21/8153

See application file for complete search history.

(56) References Cited

U.S. PATENT DOCUMENTS

| | | | |
|---|---|---|---|
| 6,137,912 | A | 10/2000 | Kostrzewski et al. |
| 6,269,351 | B1 | 7/2001 | Black |
| 6,456,990 | B1 | 9/2002 | Hofmann et al. |
| 7,788,191 | B2 | 8/2010 | Jebara |
| 7,953,682 | B2 | 5/2011 | Smith et al. |
| 8,375,014 | B1 | 2/2013 | Brocato et al. |
| 8,375,032 | B2 | 2/2013 | Birdwell et al. |
| 8,392,418 | B2 | 3/2013 | Birdwell et al. |
| 8,484,215 | B2 | 7/2013 | Anderson |
| 8,548,951 | B2 | 10/2013 | Solmer et al. |
| 8,706,659 | B1 | 4/2014 | Mann et al. |
| 8,782,744 | B1 | 7/2014 | Fuller et al. |
| 8,990,236 | B2 | 3/2015 | Mizrahy et al. |
| 9,171,146 | B2 | 10/2015 | Vipat et al. |
| 9,274,935 | B1 | 3/2016 | Lachwani et al. |
| 9,462,013 | B1 | 10/2016 | Boss et al. |
| 9,497,202 | B1 | 11/2016 | Calo et al. |
| 9,608,809 | B1 | 3/2017 | Ghetti et al. |
| 9,678,999 | B1 | 6/2017 | Gibas et al. |
| 9,716,842 | B1 | 7/2017 | Worley et al. |
| 9,754,190 | B1 | 9/2017 | Guttmann |
| 9,886,247 | B2 | 2/2018 | Laredo et al. |
| 9,912,698 | B1 | 3/2018 | Thioux et al. |
| 9,954,893 | B1 | 4/2018 | Zhao et al. |
| 10,122,969 | B1 | 11/2018 | Lim et al. |
| 10,212,428 | B2 | 2/2019 | Trepte |
| 10,282,907 | B2 | 5/2019 | Miller et al. |
| 10,453,220 | B1 | 10/2019 | Mihal et al. |
| 10,740,335 | B1* | 8/2020 | Juveneton ............ G06F 16/2455 |
| 2002/0103793 | A1 | 8/2002 | Koller et al. |
| 2003/0003861 | A1 | 1/2003 | Kagemoto et al. |
| 2003/0074368 | A1 | 4/2003 | Schuetze et al. |
| 2006/0031622 | A1 | 2/2006 | Jardine |
| 2007/0169017 | A1 | 7/2007 | Coward |
| 2007/0271287 | A1 | 11/2007 | Acharya et al. |
| 2008/0168339 | A1 | 7/2008 | Hudson et al. |
| 2008/0270363 | A1 | 10/2008 | Hunt et al. |
| 2008/0288889 | A1 | 11/2008 | Hunt et al. |
| 2009/0018996 | A1 | 1/2009 | Hunt et al. |
| 2009/0055331 | A1 | 2/2009 | Stewart |
| 2009/0055477 | A1 | 2/2009 | Flesher et al. |
| 2009/0110070 | A1 | 4/2009 | Takahashi et al. |
| 2009/0254971 | A1 | 10/2009 | Herz et al. |
| 2010/0251340 | A1 | 9/2010 | Martin et al. |
| 2010/0254627 | A1 | 10/2010 | Tehrani et al. |
| 2010/0332210 | A1 | 12/2010 | Birdwell et al. |
| 2010/0332474 | A1 | 12/2010 | Birdwell et al. |
| 2011/0179011 | A1 | 7/2011 | Cardno et al. |
| 2012/0174224 | A1 | 7/2012 | Thomas et al. |
| 2012/0284213 | A1 | 11/2012 | Lin et al. |
| 2013/0117830 | A1 | 5/2013 | Erickson et al. |
| 2013/0124526 | A1 | 5/2013 | Birdwell et al. |
| 2013/0159309 | A1 | 6/2013 | Birdwell et al. |
| 2013/0159310 | A1 | 6/2013 | Birdwell et al. |
| 2013/0167192 | A1 | 6/2013 | Hickman et al. |
| 2014/0053061 | A1 | 2/2014 | Chasen et al. |
| 2014/0195466 | A1 | 7/2014 | Phillipps et al. |
| 2014/0201126 | A1 | 7/2014 | Zadeh et al. |
| 2014/0278339 | A1 | 9/2014 | Aliferis et al. |
| 2014/0324760 | A1 | 10/2014 | Marwah et al. |
| 2014/0325662 | A1 | 10/2014 | Foster et al. |
| 2014/0365549 | A1 | 12/2014 | Jenkins |
| 2015/0032761 | A1 | 1/2015 | Pasternack |
| 2015/0058388 | A1 | 2/2015 | Smigelski |
| 2015/0066793 | A1 | 3/2015 | Brown |
| 2015/0100537 | A1 | 4/2015 | Grieves et al. |
| 2015/0220734 | A1 | 8/2015 | Nalluri et al. |
| 2015/0241873 | A1 | 8/2015 | Goldenberg et al. |
| 2015/0309987 | A1 | 10/2015 | Epstein et al. |
| 2016/0019271 | A1 | 1/2016 | Ma et al. |
| 2016/0057107 | A1 | 2/2016 | Call et al. |
| 2016/0092476 | A1 | 3/2016 | Stojanovic et al. |
| 2016/0092557 | A1 | 3/2016 | Stojanovic et al. |
| 2016/0110657 | A1 | 4/2016 | Gibiansky et al. |
| 2016/0110810 | A1 | 4/2016 | Ashok et al. |
| 2016/0119377 | A1 | 4/2016 | Goldberg et al. |
| 2016/0132787 | A1 | 5/2016 | Drevo et al. |
| 2016/0162688 | A1 | 6/2016 | Call et al. |
| 2016/0197803 | A1 | 7/2016 | Talbot et al. |
| 2016/0308900 | A1 | 10/2016 | Sadika et al. |
| 2016/0371601 | A1 | 12/2016 | Grove et al. |
| 2017/0011105 | A1 | 1/2017 | Shet et al. |
| 2017/0039271 | A1* | 2/2017 | Bishop ............... G06F 40/211 |
| 2017/0083990 | A1 | 3/2017 | Hou et al. |
| 2017/0147930 | A1 | 5/2017 | Bellala et al. |
| 2017/0220336 | A1 | 8/2017 | Chen et al. |
| 2017/0236183 | A1 | 8/2017 | Klein et al. |
| 2017/0249432 | A1 | 8/2017 | Grantcharov |
| 2017/0331858 | A1 | 11/2017 | Clark, III et al. |
| 2017/0359570 | A1 | 12/2017 | Holzer et al. |
| 2018/0018590 | A1 | 1/2018 | Szeto et al. |
| 2018/0108149 | A1 | 4/2018 | Levinshtein |
| 2018/0115706 | A1 | 4/2018 | Kang et al. |
| 2018/0150548 | A1 | 5/2018 | Shah et al. |
| 2018/0165475 | A1 | 6/2018 | Veeramachaneni et al. |
| 2018/0165728 | A1 | 6/2018 | McDonald et al. |
| 2018/0173730 | A1 | 6/2018 | Copenhaver et al. |
| 2018/0173958 | A1 | 6/2018 | Hu et al. |
| 2018/0181802 | A1 | 6/2018 | Chen et al. |
| 2018/0198602 | A1 | 7/2018 | Duffy et al. |
| 2018/0199066 | A1 | 7/2018 | Ross |
| 2018/0204111 | A1 | 7/2018 | Zadeh et al. |
| 2018/0240041 | A1 | 8/2018 | Koch et al. |
| 2018/0247078 | A1* | 8/2018 | Newman ............... G06F 16/93 |
| 2018/0248827 | A1 | 8/2018 | Scharber et al. |
| 2018/0253894 | A1 | 9/2018 | Krishnan et al. |
| 2018/0260474 | A1 | 9/2018 | Surdeanu et al. |
| 2018/0260704 | A1 | 9/2018 | Sun et al. |
| 2018/0268286 | A1 | 9/2018 | Dasgupta |
| 2018/0307978 | A1 | 10/2018 | Ar et al. |
| 2018/0336463 | A1 | 11/2018 | Bloom |
| 2018/0367484 | A1 | 12/2018 | Rodriguez et al. |
| 2019/0005657 | A1 | 1/2019 | Gao et al. |
| 2019/0026956 | A1 | 1/2019 | Gausebeck et al. |
| 2019/0034833 | A1 | 1/2019 | Ding et al. |
| 2019/0042290 | A1 | 2/2019 | Bailey et al. |
| 2019/0051051 | A1 | 2/2019 | Kaufman et al. |
| 2019/0057509 | A1 | 2/2019 | Lv et al. |
| 2019/0090834 | A1 | 3/2019 | Pauly |
| 2019/0147371 | A1 | 5/2019 | Deo et al. |
| 2019/0196600 | A1 | 6/2019 | Rothberg et al. |
| 2019/0220653 | A1 | 7/2019 | Wang et al. |

OTHER PUBLICATIONS

Park et al. ,Data Synthesis based on Generative Adversarial Networks, vol. 11 No. 10 (June), Jul. 2018. (Year: 2018).*

Acs et al., Differentially Private Mixture of Generative Neural Networks, pp. 1-13, Nov. 2017 (Year: 2017).*

Park et al. , Data Synthesis based on Generative Adversarial Nertworks, vol. 11 No. 10 (June), Jul. 2018. (Year: 2018).*

Beaulieu-Jones et al., Privacy-preserving generative deep neural networks support 1 clinical data sharing, Jul. 5, 2017, bioRxiv, total pp. 40, http://dx.doi.org/10.1101/159756 (Year: 2017).

Brkic et al., I Know That Person: Generative Full Body and Face De-Identification of People in Images, 2017 IEEE Conference on

(56) References Cited

OTHER PUBLICATIONS

Computer Vision and Pattern Recognition Workshops, pp. 1319-1328 (Year: 2017).

C. Willems, T. Holz and F. Freiling, "Toward Automated Dynamic Malware Analysis Using CWSandbox," in IEEE Security & Privacy, vol. 5, No. 2, pp. 32-39, Mar.-Apr. 2007. (Year: 2007).

Dernoncourt, F., Lee, J. Y., Uzuner, O., & Szolovits, P. (2017). De-identification of patient notes with recurrent neural networks. Journal of the American Medical Informatics Association, 24(3), 596-606. (Year: 2017).

Domadia, S. G., & Zaveri, T. (May 2011). Comparative analysis of unsupervised and supervised image classification techniques. In Proceeding of National Conference on Recent Trends in Engineering & Technology (pp. 1-5). (Year: 2011).

Escovedo, Tatiana, et al. "Detect A: abrupt concept drift detection in non-stationary environments." Applied Soft Computing 62 (2017): 119-133. (Year: 2017).

Gidaris, S., & Komodakis, N. (2017). Detect, replace, refine: Deep structured prediction for pixel wise labeling. In Proceedings of the IEEE Conference on Computer Vision and Pattern Recognition (pp. 5248-5257). (Year: 2017).

Hasegawa et al. Interoperability for Mobile Agents by Incarnation Agents. AAMAS'03 Jul. 14-18, 2003, Melbourne, Australia. (Year: 2003).

Jiang, Z., Zhao, C., He, B., Guan, Y., & Jiang, J. (2017). De-identification of medical records using conditional random fields and long short-term memory networks. Journal of biomedical informatics, 75, S43-S53. (Year: 2017).

Kim, Yoon. "Convolutional neural networks for sentence classification." arXiv preprint arXiv: 1408. 5882 (2014). (Year: 2014).

Laszlo, M., & Mukherjee, S. (2013). Optimal univariate microaggregation with data suppression. Journal of Systems and Software, 86(3), 677-682. (Year: 2013).

Malekzadeh et al., Replacement Auto Encoder: A Privacy-Preserving Algorithm for Sensory Data Analysis, 2018 IEEE/ACM Third International Conference on Internet-of-Things Design and Implementation, pp. 166-176 (Year: 2018).

Marc Aurelio Ranzato, Arthur Szlam, Joan Bruna, Michael Mathieu, Ronan Collobert, and Sumit Chopra, "Video (Language) Modeling: A Baseline For Generative Models Of Natural Videos", Article, May 4, 2016, 15 pages, Courant Institute of Mathematical Sciences.

Matthias Feurer, Jost Tobias Springenberg, Aaron Klein, Manuel Blum, Katharina Eggensperger, and Frank Hutter, "Efficient and Robust Automated Machine Learning", Advances in Neural Information Processing Systems 28 (Dec. 2015) HTTP://papers.nips.cc/pa.

Park et al., Data Synthesis based on Generative Adversarial Networks, Aug. 2018, Proceedings of the VLDB Endowment, vol. 11, No. 10, pp. 1071-1083 (Year: 2018).

Qin Gao, Will Lewis, Chris Quirk, and Mei-Yuh Hwang. 2011. Incremental training and intentional over-fitting of word alignment. In Proceedings of MT Summit XIII. (Year: 2011).

Roberts, Mike. "Serverless Architectures". https://martinfowler.com/articles/serverless.html. May 22, 2018. Accessed Jul. 22, 2019. (Year: 2018).

Vendrick, Carl, Hamed Pirsiavash, and Antonio Torralba. "Generating videos with scene dynamics." Advances In Neural Information Processing Systems. 2016 (Year: 2016).

Wiktionary. "Spin Up". https://en.wiktionary.org/w/index.php?title=spin_up&oldid=49727714. Jun. 15, 2018. Accessed Jul. 19, 2019. (Year: 2018).

Xue, Tianfan, et al. "Visual dynamics: Probabilistic future frame synthesis via cross convolutional networks." Advances in Neural Information Processing Systems. 2016 (Year: 2016).

\* cited by examiner

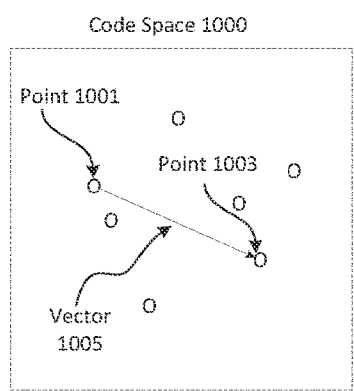 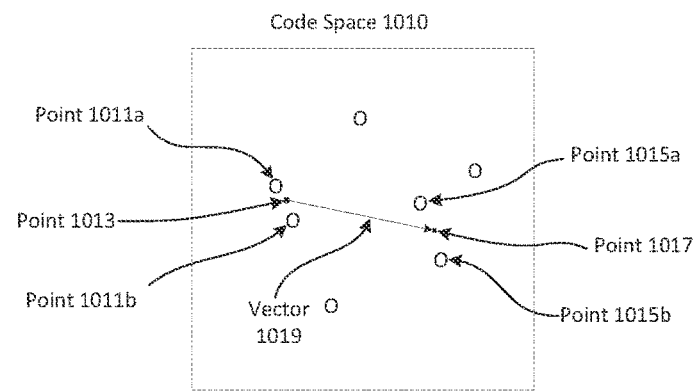
Fig. 10A                                   Fig. 10B

SYSTEMS AND METHODS FOR SYNTHETIC DATABASE QUERY GENERATION

CROSS REFERENCE TO RELATED APPLICATIONS

This application is a continuation of U.S. patent application Ser. No. 16/298,463, filed Mar. 11, 2019, currently pending which claims the benefit of U.S. Provisional Application No. 62/694,968, filed Jul. 6, 2018. The disclosures of the above-references applications are expressly incorporated herein by reference in their entirety.

TECHNICAL FIELD

The disclosed embodiments concern a platform for management of artificial intelligence systems. In particular, the disclosed embodiments concern using a disclosed platform to create models of data. These data models can be used to generate synthetic data for testing or training artificial intelligence systems. The disclosed embodiments also concern returning results based on a query input, and improvements to generative adversarial network models and adversarially learned inference models.

BACKGROUND

Training artificial intelligence systems can require substantial amounts of training data. Where there exists a lack of representative training data, application of synthetic data may be useful for performance and testing of databases. Algorithms used for data mining are currently employed for database testing but are unfortunately limited in size and scope. However, synthetic data may be utilized for effectively testing databases and performing database functions, including for example, returning results to search queries and testing times related to the returned results (real or synthetic) for search queries. For example, a recurrent neural network (RNN) or generative adversarial network (GNN) may be trained upon user input to synthetically generate data results to an input search query. Further, a system pretrained against a database query may be used to increase the speed of training for each database tested. Additionally, for each database, a pretrained system may be hyper-trained on only queries that are specific to a particular database. These advantages and other advantages may improve database testing for customer financial records, patient healthcare data, or other "sensitive data" areas or sectors.

Furthermore, synthetic data can be generally useful for testing applications and systems, beyond databases. However, existing methods of creating synthetic data can be extremely slow and error-prone and may not include statistical characteristics similar to those of the original data, limiting the utility of such data for training and testing purposes. Unfortunately, existing methods of returning real or synthetic results based on user queries are also slow and error-prone.

Therefore, a need exists for systems and methods for creating synthetic data similar to existing datasets, for effectively testing databases using synthetic data, and for training and generating query-originated real and synthetic data from a database.

SUMMARY

One aspect of the present disclosure is directed to a system for returning synthetic database query results. The system may include one or more memory units for storing instructions; and one or more processors configured to execute the instructions to perform operations. The operations may include receiving a query input by a user at a user interface; determining, based on natural language processing, a type of the query input; determining, based on the received query input and a database language interpreter, an output data format; returning, based on a generation model and the output data format, a result of the query input; providing, to a plurality of training models and based on the determined query type, the query input and the result; and training the training models, based on the query input and the result.

Another aspect of the present disclosure is directed to a non-transitory computer-readable medium storing instructions that, when executed by a processor, cause the processor to operate a computer system for returning synthetic database query results by performing operations. The operations may include receiving a query input by a user at a user interface; determining, based on natural language processing, a type of the query input; determining, based on the received query input and a database language interpreter, an output data format; returning, based on a generation model and the output data format, a result of the query input; providing, to a plurality of training models and based on the determined query type, the query input and the result; and training the training models, based on the query input and the result.

Yet another aspect of the present disclosure is directed to a computer-implemented method for returning synthetic database query results. The method may include receiving a query input by a user at a user interface; determining, based on natural language processing, a type of the query input; determining, based on the received query input and a database language interpreter, an output data format; returning, based on a generation model and the output data format, a result of the query input; providing, to a plurality of training models and based on the determined query type, the query input and the result; and training the training models, based on the query input and the result.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings:

FIGS. 10A and 10B are exemplary illustrations of points in code-space, consistent with disclosed embodiments.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

The disclosed embodiments can be used to replicate outputs of databases and create models of sensitive datasets (e.g., customer financial information, patient healthcare information, and the like). These models may replicate outputs of databases if data is scrubbed before training, and also, when an additional database operation (after generation) such as replacing values occurs. Using these models, the disclosed embodiments can produce fully synthetic datasets with structure and statistics similar to the original sensitive datasets and/or original database data. The disclosed embodiments may also provide tools for desensitizing datasets and tokenizing sensitive values to replicate output results of databases. In some embodiments, the disclosed systems can include a secure environment for training a model of sensitive data, and a non-secure environment for generating synthetic data with similar structure and statistics as the original sensitive data and/or original database data. In various embodiments, the disclosed systems can be used to tokenize the sensitive portions of a dataset (e.g., mailing addresses, social security numbers, email addresses, account numbers, demographic information, and the like). In some aspects, the dataset can include one or more JSON (JavaScript Object Notation) or delimited files (e.g., comma-separated value, or CSV, files). In various embodiments, the disclosed systems can perform generation of synthetic query results based upon a query input from a user at an interface.

Figure 1:
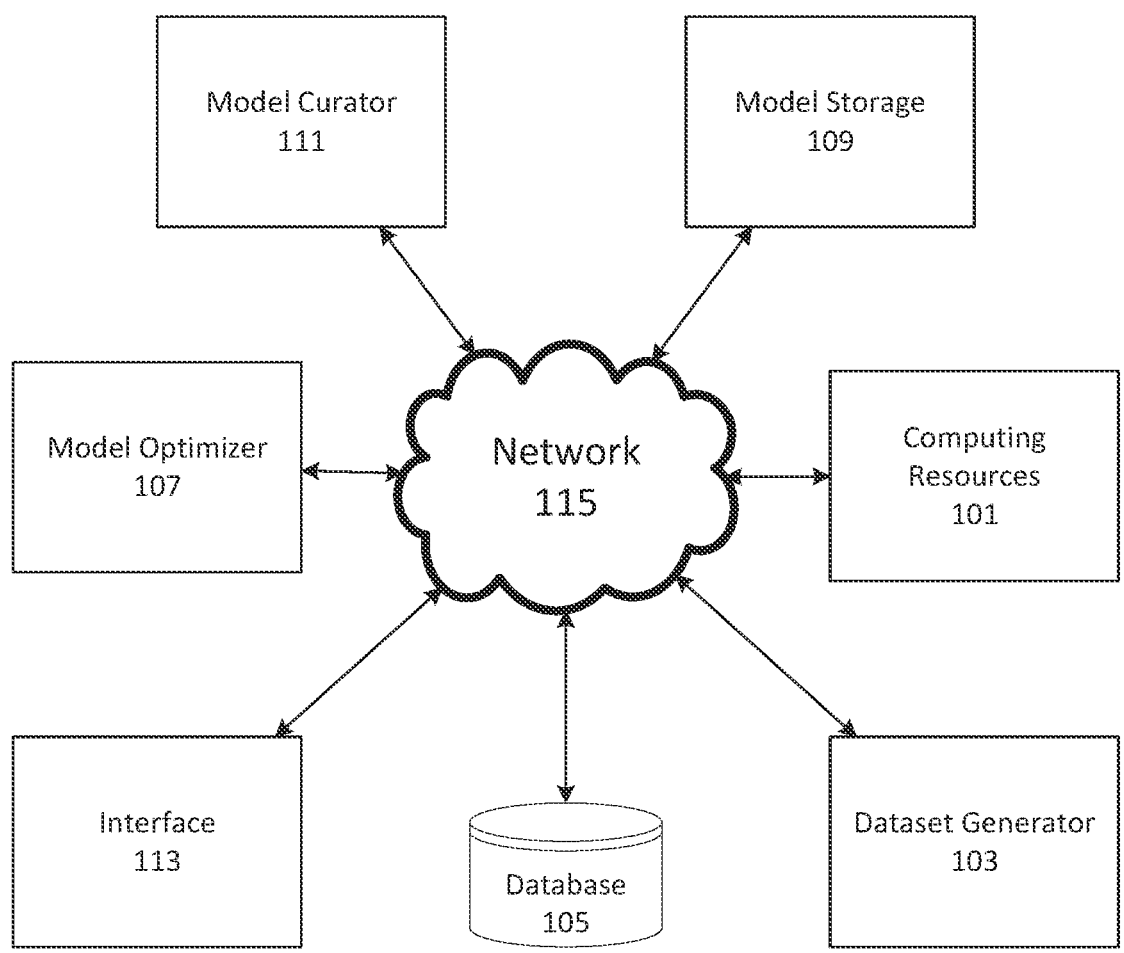
FIG. 1 depicts an exemplary cloud-computing environment for generating data models, consistent with disclosed embodiments.

FIG. 1 depicts a cloud-computing environment 100 for generating data models. Environment 100 can be configured to support generation and storage of synthetic data, generation and storage of data models, optimized choice of parameters for machine learning, and imposition of rules on synthetic data and data models. Environment 100 can be configured to expose an interface for communication with other systems. Environment 100 can include computing resources 101, a dataset generator 103, a database 105, a model optimizer 107, a model storage 109, a model curator 111, and an interface 113. These components of environment 100 can be configured to communicate with each other, or with external components of environment 100, using a network 115. The particular arrangement of components depicted in FIG. 1 is not intended to be limiting. System 100 can include additional components, or fewer components. Multiple components of system 100 can be implemented using the same physical computing device or different physical computing devices.

Computing resources 101 can include one or more computing devices configurable to train data models. The computing devices can be general purpose computers or special-purpose computing devices, such as graphical processing units (GPUs) or application-specific integrated circuits. Cloud computing instances can be general-purpose computing devices. The computing devices can be configured to host an environment for training data models. For example, the computing devices can host virtual machines, pods, or containers. The computing devices can be configured to run applications for generating data models. For example, the computing devices can be configured to run SAGEMAKER, GENESYS, or similar machine learning training applications. Computing resources 101 can be configured to receive models for training from model optimizer 107, model storage 109, or another component of system 100. Computing resources 101 can be configured provide training results, including trained models and model information, such as the type and/or purpose of the model and any measures of classification error.

Dataset generator 103 can include one or more computing devices configured to generate data. Dataset generator 103 can be configured to provide data to computing resources 101, database 105, to another component of system 100 (e.g., interface 113), or another system (e.g., an APACHE KAFKA cluster or other publication service). Dataset generator 103 can be configured to receive data from database 105 or another component of system 100. Dataset generator 103 can be configured to receive data models from model storage 109 or another component of system 100. Dataset generator 103 can be configured to generate synthetic data. For example, dataset generator 103 can be configured to generate synthetic data by identifying and replacing sensitive information in data received from database 103 or interface 113. As an additional example, dataset generator 103 can be configured to generate synthetic data using a data model without reliance on input data. For example, the data model can be configured to generate data matching statistical and content characteristics of a training dataset. In some aspects, the data model can be configured to map from a random or pseudorandom vector to elements in the training data space.

Database 105 can include one or more databases configured to store data for use by system 100. The databases can include cloud-based databases (e.g., AMAZON WEB SERVICES S3 buckets) or on-premises databases.

Model optimizer 107 can include one or more computing systems configured to manage training of data models for system 100. Model optimizer 107 can be configured to generate models for export to computing resources 101. Model optimizer 107 can be configured to generate models based on instructions received from a user or another system. These instructions can be received through interface 113. For example, model optimizer 107 can be configured to receive a graphical depiction of a machine learning model and parse that graphical depiction into instructions for creating and training a corresponding neural network on computing resources 101. Model optimizer 107 can be configured to select model training parameters. This selection can be based on model performance feedback received from computing resources 101. Model optimizer 107 can be configured to provide trained models and descriptive information concerning the trained models to model storage 109.

Model storage 109 can include one or more databases configured to store data models and descriptive information for the data models. Model storage 109 can be configured to provide information regarding available data models to a user or another system. This information can be provided using interface 113. The databases can include cloud-based databases (e.g., AMAZON WEB SERVICES S3 buckets) or on-premises databases. The information can include model information, such as the type and/or purpose of the model and any measures of classification error.

Model curator 111 can be configured to impose governance criteria on the use of data models. For example, model curator 111 can be configured to delete or control access to models that fail to meet accuracy criteria. As a further example, model curator 111 can be configured to limit the use of a model to a particular purpose, or by a particular entity or individual. In some aspects, model curator 11 can be configured to ensure that data model satisfies governance criteria before system 100 can process data using the data model.

Interface 113 can be configured to manage interactions between system 100 and other systems using network 115. In some aspects, interface 113 can be configured to publish data received from other components of system 100 (e.g., dataset generator 103, computing resources 101, database 105, or the like). This data can be published in a publication and subscription framework (e.g., using APACHE KAFKA), through a network socket, in response to queries from other systems, or using other known methods. The data can be synthetic data, as described herein. As an additional example, interface 113 can be configured to provide information received from model storage 109 regarding available datasets. In various aspects, interface 113 can be configured to provide data or instructions received from other systems to components of system 100. For example, interface 113 can be configured to receive instructions for generating data models (e.g., type of data model, data model parameters, training data indicators, training parameters, or the like) from another system and provide this information to model optimizer 107. As an additional example, interface 113 can be configured to receive data including sensitive portions from another system (e.g. in a file, a message in a publication and subscription framework, a network socket, or the like) and provide that data to dataset generator 103 or database 105.

Network 115 can include any combination of communications networks enabling communication between components of system 100. For example, network 115 may include the Internet and/or any type of wide area network, an intranet, a metropolitan area network, a local area network (LAN), a wireless network, a cellular communications network, a Bluetooth network, a radio network, a device bus, or any other type of electronics communications network known to one of skill in the art.

Figure 2:
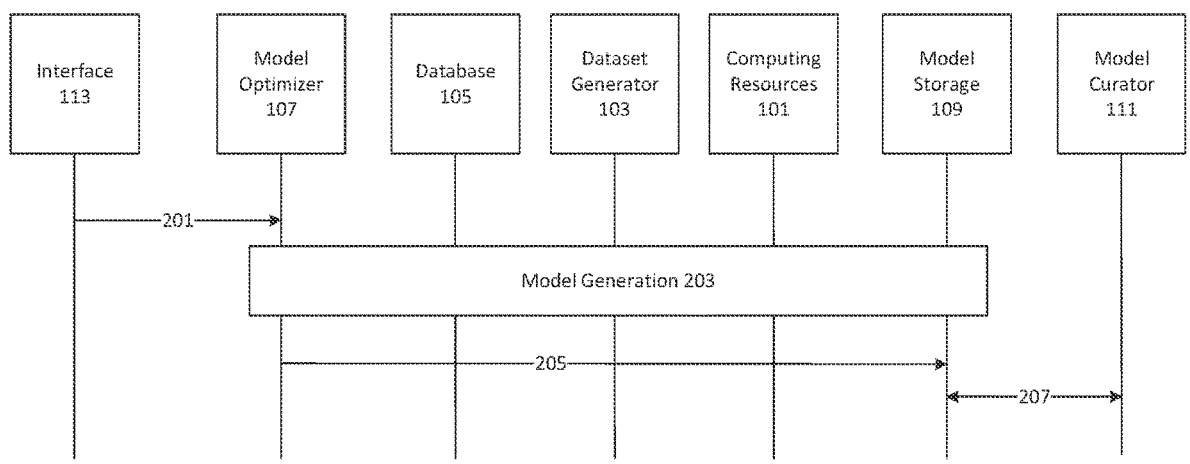
FIG. 2 depicts an exemplary process for generating data models, consistent with disclosed embodiments.

FIG. 2 depicts a process 200 for generating data models. Process 200 can be used to generate a data model for a machine learning application, consistent with disclosed embodiments. The data model can be generated using synthetic data in some aspects. This synthetic data can be generated using a synthetic dataset model, which can in turn be generated using actual data, for example, data based on the query input and returned (or results) data. The synthetic data may be similar to the actual data in terms of query type, query input values, value distributions (e.g., univariate and multivariate statistics of the synthetic data may be similar to that of the actual data), returned data, structure and ordering, or the like. In this manner, the data model for the machine learning application can be generated without directly using the actual data. As the actual data (e.g. query input and returned data) may include sensitive information and generating the data model may require distribution and/or review of training data, the use of the synthetic data can protect the privacy and security of the entities and/or individuals whose activities are recorded by the actual data.

Process 200 can then proceed to step 201. In step 201, interface 113 can provide a data model generation request to model optimizer 107. The data model generation request can include data and/or instructions describing the type of data model to be generated. For example, the data model generation request can specify a general type of data model (e.g., neural network, recurrent neural network, generative adversarial network, kernel density estimator, random data generator, or the like) and parameters specific to the particular type of model (e.g., the number of features and number of layers in a generative adversarial network or recurrent neural network). In some embodiments, a recurrent neural network can include long short term memory modules (LSTM units), or the like.

Process 200 can then proceed to step 203. In step 203, one or more components of system 100 can interoperate to generate a data model. For example, as described in greater detail with respect to FIG. 3, a data model can be trained using computing resources 101 being provided with data by dataset generator 103. In some aspects, this data can be generated using dataset generator 103 from data stored in database 105. In various aspects, the data can be actual data (e.g. query input and returned data) or synthetic data retrieved from database 105. This training can be supervised by model optimizer 107, which can be configured to select model parameters (e.g., number of layers for a neural network, kernel function for a kernel density estimator, or the like), update training parameters, and evaluate model characteristics (e.g., the similarity of the synthetic data generated by the model to the actual data, such as query input and returned data). In some embodiments, model optimizer 107 can be configured to provision computing resources 101 with an initialized data model for training. The initialized data model can be, or can be based upon, a model retrieved from model storage 109.

Process 200 can then proceed to step 205. In step 205, model optimizer 107 can evaluate the performance of the trained synthetic data model. When the performance of the trained synthetic data model satisfies performance criteria, model optimizer 107 can be configured to store the trained synthetic data model in model storage 109. For example, model optimizer 107 can be configured to determine one or more values for similarity and/or predictive accuracy metrics, as described herein. In some embodiments, based on values for similarity metrics, model optimizer 107 can be configured to assign a category to the synthetic data model.

According to a first category, the synthetic data model generates data maintaining a moderate level of correlation or similarity with the original data, matches well with original schema, and does not generate too many row or value duplicates. According to a second category, the synthetic data model may generate data maintaining a high level of correlation or similarity of the original level, and therefore could potentially cause data to be discernable from the original data (e.g., a data leak). A synthetic data model generating data failing to match the schema with the original data or providing many duplicated rows and values may also be placed in this category. According to a third category, the synthetic data model may likely generate data maintaining a high level of correlation or similarity with the original level, likely allowing a data leak. A synthetic data model generating data badly failing to match the schema with the original data or providing far too many duplicated rows and values may also be placed in this category.

In some embodiments, system 100 can be configured to provide instructions for improving the quality of the synthetic data model. If a user requires synthetic data reflecting less correlation or similarity with the original data, the use can change the models' parameters to make them perform worse (e.g., by decreasing number of layers in GAN models, or reducing the number of training iterations). If the users want the synthetic data to have better quality, they can change the models' parameters to make them perform better (e.g., by increasing number of layers in GAN models, or increasing the number of training iterations).

Process 200 can then proceed to step 207. In step 207, model curator 111 can evaluate the trained synthetic data model for compliance with governance criteria.

Figure 3:
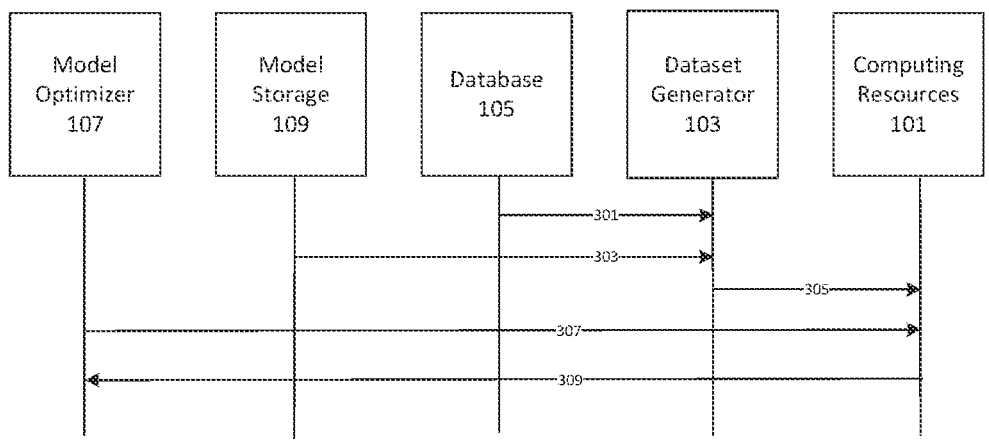
FIG. 3 depicts an exemplary process for generating synthetic data using existing data models, consistent with disclosed embodiments.

FIG. 3 depicts a process 300 for generating a data model using an existing synthetic data model, consistent with disclosed embodiments. Process 300 can include the steps of retrieving a synthetic dataset model from model storage 109, retrieving data from database 105, providing synthetic data to computing resources 101, providing an initialized data model to computing resources 101, and providing a trained data model to model optimizer 107. In this manner, process 300 can allow system 100 to generate a model using synthetic data.

Process 300 begins with step 301. In step 301, dataset generator 103 can retrieve a query input and/or output. In some aspects, the query input and/or output can include actual training data (e.g. query input and returned data). In other aspects, the query input and/or output may include synthetic training data. In some embodiments, dataset generator 103 can be configured to generate synthetic data from sample values. For example, dataset generator 103 can be configured to use the generative network of a generative adversarial network to generate data samples from random-valued vectors. In such embodiments, process 300 may forgo step 301.

Process 300 can then proceed to step 303. In step 303, dataset generator 103 can be configured to receive a synthetic data model from model storage 109. In some embodiments, model storage 109 can be configured to provide the synthetic data model to dataset generator 103 in response to a request from dataset generator 103. In various embodiments, model storage 109 can be configured to provide the synthetic data model to dataset generator 103 in response to a request from model optimizer 107, or another component of system 100. As a non-limiting example, the synthetic data model can be a neural network, recurrent neural network (which may include LSTM units), generative adversarial network, kernel density estimator, random value generator, or the like.

Process 300 can then proceed to step 305. In step 305, in some embodiments, dataset generator 103 can generate synthetic data. Dataset generator 103 can also be configured to use the data model retrieved from model storage 109 to generate a synthetic dataset by replacing the sensitive data items with synthetic data items.

Dataset generator 103 can be configured to provide the synthetic dataset to computing resources 101. In some embodiments, dataset generator 103 can be configured to provide the synthetic dataset to computing resources 101 in response to a request from computing resources 101, from model optimizer 107, or from another component of system 100. In various embodiments, dataset generator 103 can be configured to provide the synthetic dataset to database 105 for storage. In such embodiments, computing resources 101 can be configured to subsequently retrieve the synthetic dataset from database 105 directly, or indirectly through model optimizer 107 or dataset generator 103.

Process 300 can then proceed to step 307. In step 307, computing resources 101 can be configured to receive a data model from model optimizer 107, consistent with disclosed embodiments. In some embodiments, the data model can be at least partially initialized by model optimizer 107. For example, at least some of the initial weights and offsets of a neural network model received by computing resources 101 in step 307 can be set by model optimizer 107. In various embodiments, computing resources 101 can be configured to receive at least some training parameters from model optimizer 107 (e.g., batch size, number of training batches, number of epochs, chunk size, time window, input noise dimension, or the like).

Process 300 can then proceed to step 309. In step 309, computing resources 101 can generate a trained data model using the data model received from model optimizer 107 and the synthetic dataset received from dataset generator 103. For example, computing resources 101 can be configured to train the data model received from model optimizer 107 until some training criterion is satisfied. The training criterion can be, for example, a performance criterion (e.g., a Mean Absolute Error, Root Mean Squared Error, percent good classification, and the like), a convergence criterion (e.g., a minimum required improvement of a performance criterion over iterations or over time, a minimum required change in model parameters over iterations or over time), elapsed time or number of iterations, or the like. In some embodiments, the performance criterion can be a threshold value for a similarity metric or prediction accuracy metric to be described below. Satisfaction of the training criterion can be determined by one or more of computing resources 101 and model optimizer 107. In some embodiments, computing resources 101 can be configured to update model optimizer 107 regarding the training status of the data model. For example, computing resources 101 can be configured to provide the current parameters of the data model and/or current performance criteria of the data model. In some embodiments, model optimizer 107 can be configured to stop the training of the data model by computing resources 101. In various embodiments, model optimizer 107 can be configured to retrieve the data model from computing resources 101. In some embodiments, computing resources 101 can be configured to stop the training the data model and provide the trained data model to model optimizer 107.

Figure 4A:
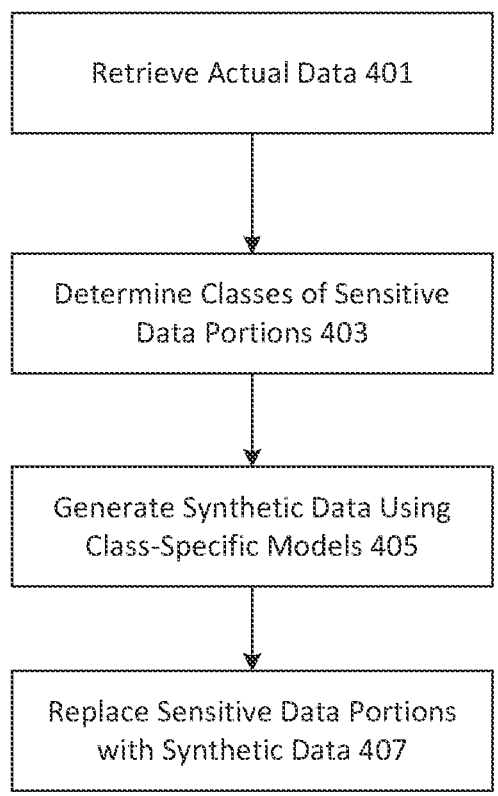
FIG. 4A depicts an exemplary process for generating synthetic data using class-specific models, consistent with disclosed embodiments.

FIG. 4A depicts process 400 for generating synthetic data using class-specific models, consistent with disclosed embodiments. System 100, or a similar system, may be configured to use such synthetic data in training a data model for use in another application (e.g., a fraud detection application). Process 400 can include the steps of retrieving actual data (e.g. query input and returned data), determining classes of sensitive portions of the data, generating synthetic data using a data model for the appropriate class, and replacing the sensitive data portions with the synthetic data portions. In some embodiments, the data model can be a generative adversarial network trained to generate synthetic data satisfying a similarity criterion, as described herein. By using class-specific models, process 400 can generate better synthetic data that more accurately models the underlying actual data than randomly generated training data that lacks the latent structures present in the actual data. Because the synthetic data more accurately models the underlying actual data, a data model trained using this improved synthetic data may exhibit better performance when processing the actual data.

Process 400 begins with step 401. In step 401, dataset generator 103 can be configured to retrieve actual data (e.g. query input and/or returned data). As a non-limiting example, the actual data may have been gathered from user input executing a search query during the course of ordinary business operations, marketing operations, research operations, or the like. Dataset generator 103 can be configured to retrieve the actual data from database 105 or from another system. The actual data may have been purchased in whole or in part by an entity associated with system 100. As would be understood from this description, the source and corn position of the actual data is not intended to be limiting.

Process 400 can then proceed to step 403. In step 403, dataset generator 103 can be configured to determine classes of the sensitive portions of the actual data (e.g. query input and/or returned data). As a non-limiting example, when the actual data is account transaction data, classes could include account numbers and merchant names. As an additional non-limiting example, when the actual data is personnel records, classes could include employee identification numbers, employee names, employee addresses, contact information, marital or beneficiary information, title and salary information, and employment actions. Consistent with disclosed embodiments, dataset generator 103 can be configured with a classifier for distinguishing different classes of sensitive information. In some embodiments, dataset generator 103 can be configured with a recurrent neural network for distinguishing different classes of sensitive information. Dataset generator 103 can be configured to apply the classifier to the actual data to determine that a sensitive portion of the training dataset belongs to the data class. For example, when the data stream includes the text string "Lorem ipsum 012-34-5678 dolor sit amet" the classifier may be configured to indicate that positions 13-23 of the text string are the same format as a social security number, and thus may potentially constitute a social security number. Though described with reference to character string substitutions, the disclosed systems and methods are not so limited. As a non-limiting example, the actual data can include unstructured data (e.g., character strings, tokens, and the like) and structured data (e.g., key-value pairs, relational database files, spreadsheets, and the like).

Process 400 can then proceed to step 405. In step 405, dataset generator 103 can be configured to generate a synthetic portion using a class-specific model. To continue the previous example, dataset generator 103 can generate a synthetic social security number using a synthetic data model trained to generate social security numbers. In some embodiments, this class-specific synthetic data model can be trained to generate synthetic portions similar to those appearing in the actual data. For example, as social security numbers include an area number indicating geographic information and a group number indicating date-dependent information, the range of social security numbers present in an actual dataset can depend on the geographic origin and purpose of that dataset. A dataset of social security numbers for elementary school children in a particular school district may exhibit different characteristics than a dataset of social security numbers for employees of a national corporation. To continue the previous example, the social security-specific synthetic data model could generate the synthetic portion "03-74-3285."

Process 400 can then proceed to step 407. In step 407, dataset generator 103 can be configured to replace the sensitive portion of the actual data with the synthetic portion. To continue the previous example, dataset generator 103 could be configured to replace the characters at positions 13-23 of the text string with the values "013-74-3285," creating the synthetic text string "Lorem ipsum 013-74-3285 dolor sit amet." This text string can now be distributed without disclosing the sensitive information originally present. But this text string can still be used to train models that make valid inferences regarding the actual data, because synthetic social security numbers generated by the synthetic data model share the statistical characteristic of social security numbers in the actual data.

Figure 4B:
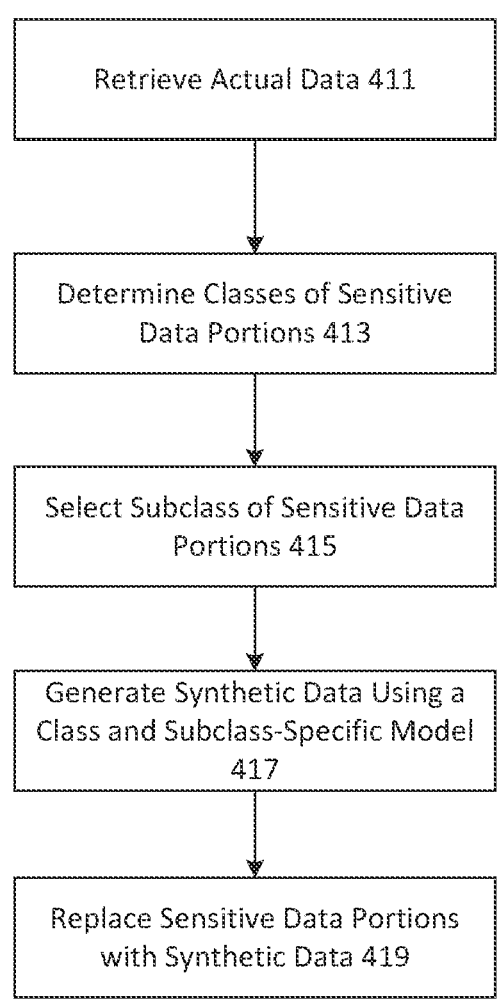
FIG. 4B depicts an exemplary process for generating synthetic data using class and subclass-specific models, consistent with disclosed embodiments.

FIG. 4B depicts a process 410 for generating synthetic data using class and subclass-specific models, consistent with disclosed embodiments. Process 410 can include the steps of retrieving actual data (e.g. query input and returned data), determining classes of sensitive portions of the data, selecting types for synthetic data used to replace the sensitive portions of the actual data, generating synthetic data using a data model for the appropriate type and class, and replacing the sensitive data portions with the synthetic data portions. In some embodiments, the data model can be a generative adversarial network trained to generate synthetic data satisfying a similarity criterion, as described herein. This improvement addresses a problem with synthetic data generation, that a synthetic data model may fail to generate examples of proportionately rare data subclasses. For example, when data can be classified into two distinct subclasses, with a second subclass far less prevalent in the data than a first subclass, a model of the synthetic data may generate only examples of the most first data subclasses. An example of data which can be classified into two distinct subclasses is synthetic data. The synthetic data model effectively focuses on generating the best examples of the most common data subclasses, rather than acceptable examples of all the data subclasses. Process 410 addresses this problem by expressly selecting subclasses of the synthetic data class according to a distribution model based on the actual data.

Process 410 begins with steps 411 and 413, which resemble steps 401 and 403 in process 400. In step 411, dataset generator 103 can be configured to receive actual data. In step 413, dataset generator can be configured to determine classes of sensitive portions of the actual data. In a non-limiting example, dataset generator 103 can be configured to determine that a sensitive portion of the data may contain a financial service account number. Dataset generator 103 can be configured to identify this sensitive portion of the data as a financial service account number using a classifier, which may in some embodiments be a recurrent neural network (which may include LSTM units).

Process 410 can then proceed to step 415. In step 415, dataset generator 103 can be configured to select a subclass for generating the synthetic data. In some aspects, this selection in not governed by the subclass of the identified sensitive portion. For example, in some embodiments the classifier that identifies the class need not be sufficiently discerning to identify the subclass, relaxing the requirements on the classifier. Instead, this selection is based on a distribution model. For example, dataset generator 103 can be configured with a statistical distribution of subclasses (e.g., a univariate distribution of subclasses) for that class and can select one of the subclasses for generating the synthetic data according to the statistical distribution. To continue the previous example, individual accounts and trust accounts may both be financial service account numbers, but the values of these account numbers may differ between individual accounts and trust accounts. Furthermore, there may be 19 individual accounts for every 1 trust account. In this example, dataset generator 103 can be configured to select the trust account subclass 1 time in 20 and use a synthetic data model for financial service account numbers for trust accounts to generate the synthetic data. As a further example, dataset generator 103 can be configured with a recurrent neural network that estimates the next subclass based on the current and previous subclasses. For example, healthcare records can include cancer diagnosis stage as sensitive data. Most cancer diagnosis stage values may be "no cancer" and the value of "stage 1" may be rare, but when present in a patient record this value may be followed by "stage 2," etc. The recurrent neural network can be trained on the actual healthcare records to use prior and cancer diagnosis stage values when selecting the subclass. For example, when generating a synthetic healthcare record, the recurrent neural network can be configured to use the previously selected cancer diagnosis stage subclass in selecting the present cancer diagnosis stage subclass. In this manner, the synthetic healthcare record can exhibit an appropriate progression of patient health that matches the progression in the actual data.

Process 410 can then proceed to step 417. In step 417, which resembles step 405, dataset generator 103 can be configured to generate synthetic data using a class and subclass specific model. To continue the previous financial service account number example, dataset generator 103 can be configured to use a synthetic data for trust account financial service account numbers to generate the synthetic financial server account number.

Process 410 can then proceed to step 419. In step 419, which resembles step 407, dataset generator 103 can be configured to replace the sensitive portion of the actual data (query data or return data) with the generated synthetic data. For example, dataset generator 103 can be configured to replace the financial service account number in the actual data as part of a query input with the synthetic trust account financial service account number.

Figure 5:
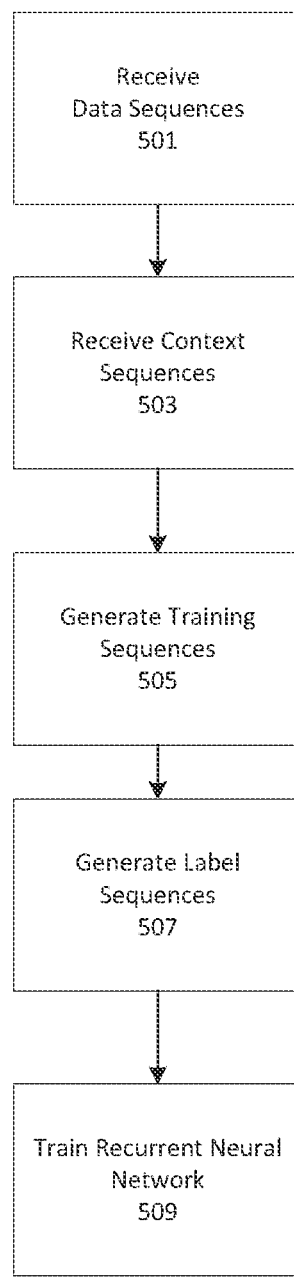
FIG. 5 depicts an exemplary process for training a classifier for generation of synthetic data, consistent with disclosed embodiments.

FIG. 5 depicts a process 600 for training a classifier for generation of synthetic data. In some embodiments, such a classifier could be used by dataset generator 103 to classify sensitive data portions of actual data, as described above with regard to FIGS. 4A and 4B. Process 500 can include the steps of receiving data sequences 501, receiving content sequences 503, generating training sequences 505, generating label sequences 507, and training a classifier using the training sequences and the label sequences (e.g. train recurrent neural network 509). By using known data sequences and content sequences unlikely to contain sensitive data, process 500 can be used to automatically generate a corpus of labeled training data. Process 500 can be performed by a component of system 100, such as dataset generator 103 or model optimizer 107.

Process 500 begins with step 501. In step 501, system 100 can receive training data sequences from, for example, a dataset. The dataset providing the training data sequences can be a component of system 100 (e.g., database 105) or a component of another system. The data sequences can include multiple classes considered to be sensitive data. As a non-limiting example, the data sequences can include account numbers, social security numbers, and full names.

Figure 6:
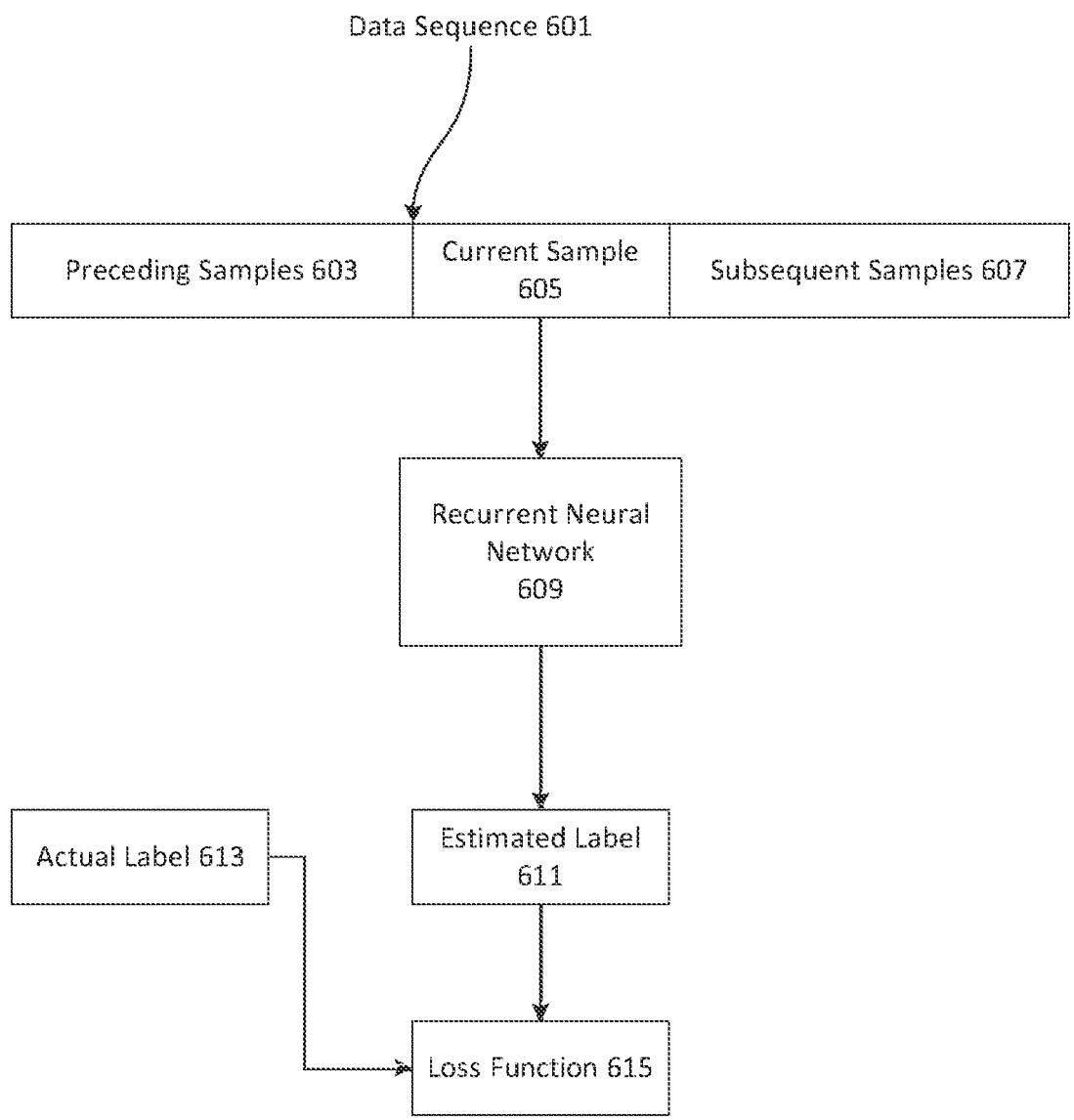
FIG. 6 depicts another exemplary process for training a classifier for generation of synthetic data, consistent with disclosed embodiments.

FIG. 6 depicts a process 600 for training a classifier for generation of synthetic data, consistent with disclosed embodiments. According to process 600, a data sequence 601 can include preceding samples 603, current sample 605, and subsequent samples 607. In some embodiments, data sequence 601 can be a subset of a training sequence, as described above with regards to FIG. 5. Data sequence 601 may be applied to recurrent neural network 609. In some embodiments, neural network 609 can be configured to estimate whether current sample 605 is part of a sensitive data portion of data sequence 601 based on the values of preceding samples 603, current sample 605, and subsequent samples 607. In some embodiments, preceding samples 603 can include between 1 and 100 samples, for example between 25 and 75 samples. In various embodiments, subsequent samples 607 can include between 1 and 100 samples, for example between 25 and 75 samples. In some embodiments, the preceding samples 603 and the subsequent samples 607 can be paired and provided to recurrent neural network 609 together. For example, in a first iteration, the first sample of preceding samples 603 and the last sample of subsequent samples 607 can be provided to recurrent neural network 609. In the next iteration, the second sample of preceding samples 603 and the second-to-last sample of subsequent samples 607 can be provided to recurrent neural network 609. System 100 can continue to provide samples to recurrent neural network 609 until all of preceding samples 603 and subsequent samples 607 have been input to recurrent neural network 609. System 100 can then provide current sample 605 to recurrent neural network 609. The output of recurrent neural network 609 after the input of current sample 605 can be estimated label 611. Estimated label 611 can be the inferred class or subclass of current sample 605, given data sequence 601 as input. In some embodiments, estimated label 611 can be compared to actual label 613 to calculate a loss function. Actual label 613 can correspond to data sequence 601. For example, when data sequence 601 is a subset of a training sequence, actual label 613 can be an element of the label sequence corresponding to the training sequence. In some embodiments, actual label 613 can occupy the same position in the label sequence as occupied by current sample 605 in the training sequence. Consistent with disclosed embodiments, system 100 can be configured to update recurrent neural network 609 using loss function 615 based on a result of the comparison.

Figure 7:
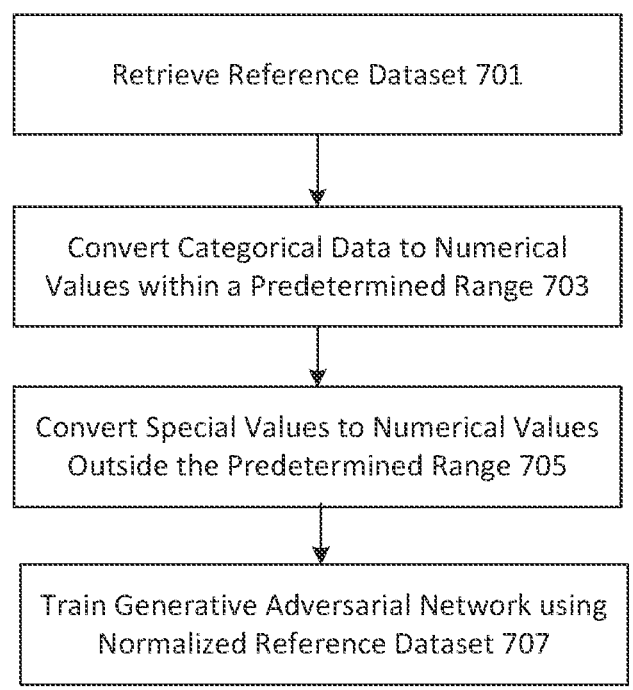
FIG. 7 depicts an exemplary process for training a generative adversarial using a normalized reference dataset, consistent with disclosed embodiments.

FIG. 7 depicts a process 700 for training a generative adversarial network using a normalized reference dataset. In some embodiments, the generative adversarial network can be used by system 100 (e.g., by dataset generator 103) to generate synthetic data (e.g., as described above with regards to FIGS. 2, 3, 4A and 4B). The generative adversarial network can include a generator network and a discriminator network. The generator network can be configured to learn a mapping from a sample space (e.g., a random number or vector) to a data space (e.g. the values of the sensitive data). The discriminator can be configured to determine, when presented with either an actual data sample or a sample of synthetic data generated by the generator network, whether the sample was generated by the generator network or was a sample of actual data. As training progresses, the generator can improve at generating the synthetic data and the discriminator can improve at determining whether a sample is actual or synthetic data. In this manner, a generator can be automatically trained to generate synthetic data similar to the actual data (query data or return data). However, a generative adversarial network can be limited by the actual data. For example, an unmodified generative adversarial network may be unsuitable for use with categorical data or data including missing values, not-a-numbers, or the like. For example, the generative adversarial network may not know how to interpret such data. Disclosed embodiments address this technical problem by at least one of normalizing categorical data or replacing missing values with supra-normal values.

Process 700 begins with step 701. In step 701, system 100 (e.g., dataset generator 103) can retrieve a reference dataset from a database (e.g., database 105). The reference dataset can include categorical data. For example, the reference dataset can include spreadsheets or relational databases with categorical-valued data columns. As a further example, the reference dataset can include missing values, not-a-number values, or the like.

Process 700 can then proceed to step 703. In step 703, system 100 (e.g., dataset generator 103) can generate a normalized training dataset by normalizing the reference dataset. For example, system 100 can be configured to normalize categorical data contained in the reference dataset. In some embodiments, system 100 can be configured to normalize the categorical data by converting this data to numerical values. The numerical values can lie within a predetermined range. In some embodiments, the predetermined range can be zero to one. For example, given a column of categorical data including the days of the week, system 100 can be configured to map these days to values between zero and one. In some embodiments, system 100 can be configured to normalize numerical data in the reference dataset as well, mapping the values of the numerical data to a predetermined range.

Process 700 can then proceed to step 705. In step 705, system 100 (e.g., dataset generator 103) can generate the normalized training dataset by converting special values to values outside the predetermined range. For example, system 100 can be configured to assign missing values a first numerical value outside the predetermined range. As an additional example, system 100 can be configured to assign not-a-number values to a second numerical value outside the predetermined range. In some embodiments, the first value and the second value can differ. For example, system 100 can be configured to map the categorical values and the numerical values to the range of zero to one. In some embodiments, system 100 can then map missing values to the numerical value 1.5. In various embodiments, system 100 can then map not-a-number values to the numerical value of −0.5. In this manner system 100 can preserve information about the actual data while enabling training of the generative adversarial network.

Process 700 can then proceed to step 707. In step 707, system 100 (e.g., dataset generator 103) can train the generative network using the normalized dataset, consistent with disclosed embodiments.

Figure 8:
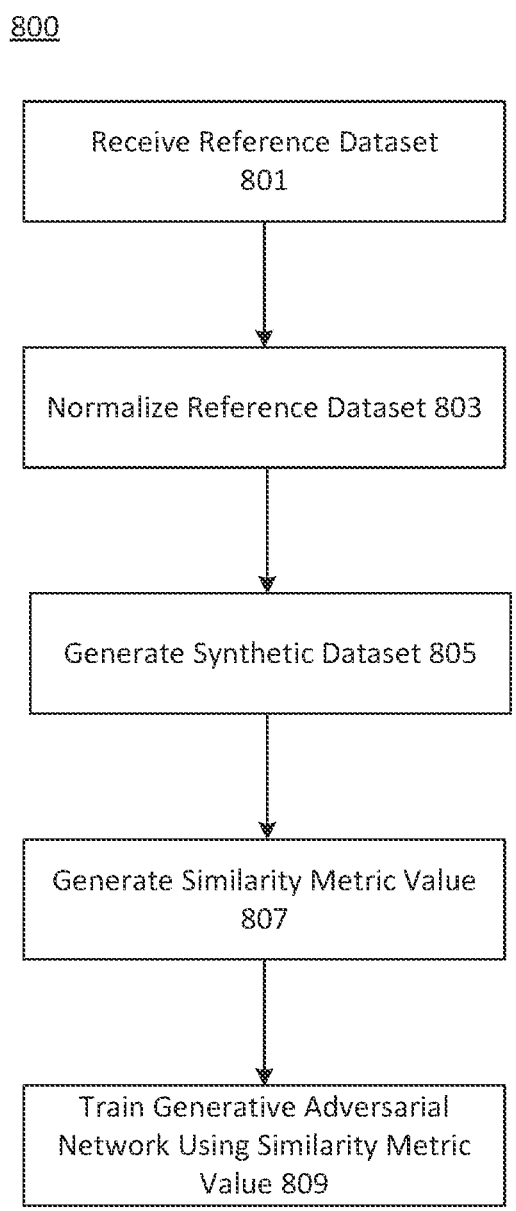
FIG. 8 depicts an exemplary process for training a generative adversarial network using a loss function configured to ensure a predetermined degree of similarity, consistent with disclosed embodiments.

FIG. 8 depicts a process 800 for training a generative adversarial network using a loss function configured to ensure a predetermined degree of similarity, consistent with disclosed embodiments. System 100 can be configured to use process 800 to generate synthetic data that is similar, but not too similar to the actual data, as the actual data can include sensitive personal information. For example, when the actual data includes social security numbers or account numbers, the synthetic data would preferably not simply recreate these numbers. Instead, system 100 would preferably create synthetic data that resembles the actual data, as described below, while reducing the likelihood of overlapping values. To address this technical problem, system 100 can be configured to determine a similarity metric value between the synthetic dataset and the normalized reference dataset, consistent with disclosed embodiments. System 100 can be configured to use the similarity metric value to update a loss function for training the generative adversarial network. In this manner, system 100 can be configured to determine a synthetic dataset differing in value from the normalized reference dataset at least a predetermined amount according to the similarity metric.

While described below with regards to training a synthetic data model, dataset generator 103 can be configured to use such trained synthetic data models to generate synthetic data (e.g., as described above with regards to FIGS. 2 and 3). For example, development instances and production instances can be configured to generate data similar to a reference dataset according to the disclosed systems and methods.

Process 800 can then proceed to step 801, which can resemble step 701. In step 801, system 100 (e.g., model optimizer 107, computational resources 101, or the like) can receive a reference dataset. In some embodiments, system 100 can be configured to receive the reference dataset from a database (e.g., database 105). The reference dataset can include categorical and/or numerical data. For example, the reference dataset can include spreadsheet or relational database data. In some embodiments, the reference dataset can include special values, such as missing values, not-a-number values, or the like.

Process 800 can then proceed to step 803. In step 803, system 100 (e.g., dataset generator 103, model optimizer 107, computational resources 101, or the like) can be configured to normalize the reference dataset. In some instances, system 100 can be configured to normalize the reference dataset as described above with regards to steps 703 and 705 of process 700. For example, system 100 can be configured to normalize the categorical data and/or the numerical data in the reference dataset to a predetermined range. In some embodiments, system 100 can be configured to replace special values with numerical values outside the predetermined range.

Process 800 can then proceed to step 805. In step 805, system 100 (e.g., model optimizer 107, computational resources 101, or the like) can generate a synthetic training dataset using the generative network. For example, system 100 can apply one or more random samples to the generative network to generate one or more synthetic data items. In some instances, system 100 can be configured to generate between 200 and 400,000 data items, or preferably between 20,000 and 40,000 data items.

Process 800 can then proceed to step 807. In step 807, system 100 (e.g., model optimizer 107, computational resources 101, or the like) can determine a similarity metric value using the normalized reference dataset and the synthetic training dataset. System 100 can be configured to generate the similarity metric value according to a similarity metric. In some aspects, the similarity metric value can include at least one of a statistical correlation score (e.g., a score dependent on the covariances or univariate distributions of the synthetic data and the normalized reference dataset), a data similarity score (e.g., a score dependent on a number of matching or similar elements in the synthetic dataset and normalized reference dataset), or data quality score (e.g., a score dependent on at least one of a number of duplicate elements in each of the synthetic dataset and normalized reference dataset, a prevalence of the most common value in each of the synthetic dataset and normalized reference dataset, a maximum difference of rare values in each of the synthetic dataset and normalized reference dataset, the differences in schema between the synthetic dataset and normalized reference dataset, or the like). System 100 can be configured to calculate these scores using the synthetic dataset and a reference dataset.

In some aspects, the similarity metric can depend on a covariance of the synthetic dataset and a covariance of the normalized reference dataset. For example, in some embodiments, system 100 can be configured to generate a difference matrix using a covariance matrix of the normalized reference dataset and a covariance matrix of the synthetic dataset. As a further example, the difference matrix can be the difference between the covariance matrix of the normalized reference dataset and the covariance matrix of the synthetic dataset. The similarity metric can depend on the difference matrix. In some aspects, the similarity metric can depend on the summation of the squared values of the difference matrix. This summation can be normalized, for example by the square root of the product of the number of rows and number of columns of the covariance matrix for the normalized reference dataset.

In some embodiments, the similarity metric can depend on a univariate value distribution of an element of the synthetic dataset and a univariate value distribution of an element of the normalized reference dataset. For example, for corresponding elements of the synthetic dataset and the normalized reference dataset, system 100 can be configured to generate histograms having the same bins. For each bin, system 100 can be configured to determine a difference between the value of the bin for the synthetic data histogram and the value of the bin for the normalized reference dataset histogram. In some embodiments, the values of the bins can be normalized by the total number of datapoints in the histograms. For each of the corresponding elements, system 100 can be configured to determine a value (e.g., a maximum difference, an average difference, a Euclidean distance, or the like) of these differences. In some embodiments, the similarity metric can depend on a function of this value (e.g., a maximum, average, or the like) across the common elements. For example, the normalized reference dataset can include multiple columns of data. The synthetic dataset can include corresponding columns of data. The normalized reference dataset and the synthetic dataset can include the same number of rows. System 100 can be configured to generate histograms for each column of data for each of the normalized reference dataset and the synthetic dataset. For each bin, system 100 can determine the difference between the count of datapoints in the normalized reference dataset histogram and the synthetic dataset histogram. System 100 can determine the value for this column to be the maximum of the differences for each bin. System 100 can determine the value for the similarity metric to be the average of the values for the columns. As would be appreciated by one of skill in the art, this example is not intended to be limiting.

In various embodiments, the similarity metric can depend on a number of elements of the synthetic dataset that match elements of the reference dataset. In some embodiments, the matching can be an exact match, with the value of an element in the synthetic dataset matching the value of an element in the normalized reference dataset. As a nonlimiting example, when the normalized reference dataset includes a spreadsheet having rows and columns, and the synthetic dataset includes a spreadsheet having rows and corresponding columns, the similarity metric can depend on the number of rows of the synthetic dataset that have the same values as rows of the normalized reference dataset. In some embodiments, the normalized reference dataset and synthetic dataset can have duplicate rows removed prior to performing this comparison. System 100 can be configured to merge the non-duplicate normalized reference dataset and non-duplicate synthetic dataset by all columns. In this nonlimiting example, the size of the resulting dataset will be the number of exactly matching rows. In some embodiments, system 100 can be configured to disregard columns that appear in one dataset but not the other when performing this comparison.

In various embodiments, the similarity metric can depend on a number of elements of the synthetic dataset that are similar to elements of the normalized reference dataset. System 100 can be configured to calculate similarity between an element of the synthetic dataset and an element of the normalized reference dataset according to distance measure. In some embodiments, the distance measure can depend on a Euclidean distance between the elements. For example, when the synthetic dataset and the normalized reference dataset include rows and columns, the distance measure can depend on a Euclidean distance between a row of the synthetic dataset and a row of the normalized reference dataset. In various embodiments, when comparing a synthetic dataset to an actual dataset including categorical data (e.g., a reference dataset that has not been normalized), the distance measure can depend on a Euclidean distance between numerical row elements and a Hamming distance between non-numerical row elements. The Hamming distance can depend on a count of non-numerical elements differing between the row of the synthetic dataset and the row of the actual dataset. In some embodiments, the distance measure can be a weighted average of the Euclidean distance and the Hamming distance. In some embodiments, system 100 can be configured to disregard columns that appear in one dataset but not the other when performing this comparison. In various embodiments, system 100 can be configured to remove duplicate entries from the synthetic dataset and the normalized reference dataset before performing the comparison.

In some embodiments, system 100 can be configured to calculate a distance measure between each row of the synthetic dataset (or a subset of the rows of the synthetic dataset) and each row of the normalized reference dataset (or a subset of the rows of the normalized reference dataset). System 100 can then determine the minimum distance value for each row of the synthetic dataset across all rows of the normalized reference dataset. In some embodiments, the similarity metric can depend on a function of the minimum distance values for all rows of the synthetic dataset (e.g., a maximum value, an average value, or the like).

In some embodiments, the similarity metric can depend on a frequency of duplicate elements in the synthetic dataset and the normalized reference dataset. In some aspects, system 100 can be configured to determine the number of duplicate elements in each of the synthetic dataset and the normalized reference dataset. In various aspects, system 100 can be configured to determine the proportion of each dataset represented by at least some of the elements in each dataset. For example, system 100 can be configured to determine the proportion of the synthetic dataset having a particular value. In some aspects, this value may be the most frequent value in the synthetic dataset. System 100 can be configured to similarly determine the proportion of the normalized reference dataset having a particular value (e.g., the most frequent value in the normalized reference dataset).

In some embodiments, the similarity metric can depend on a relative prevalence of rare values in the synthetic and normalized reference dataset. In some aspects, such rare values can be those present in a dataset with frequencies less than a predefined threshold. In some embodiments, the predetermined threshold can be a value less than 20%, for example 10%. System 100 can be configured to determine a prevalence of rare values in the synthetic and normalized reference dataset. For example, system 100 can be configured to determine counts of the rare values in a dataset and the total number of elements in the dataset. System 100 can then determine ratios of the counts of the rare values to the total number of elements in the datasets.

In some embodiments, the similarity metric can depend on differences in the ratios between the synthetic dataset and the normalized reference dataset. As a non-limiting example, an exemplary dataset can be an access log for patient medical records that tracks the job title of the employee accessing a patient medical record. The job title "Administrator" may be a rare value of job title and appear in 3% of the log entries. System 100 can be configured to generate synthetic log data based on the actual dataset, but the job title "Administrator" may not appear in the synthetic log data. The similarity metric can depend on difference between the actual dataset prevalence (3%) and the synthetic log data prevalence (0%).

As an alternative example, the job title "Administrator" may be overrepresented in the synthetic log data, appearing in 15% of the of the log entries (and therefore not a rare value in the synthetic log data when the predetermined threshold is 10%). In this example, the similarity metric can depend on difference between the actual dataset prevalence (3%) and the synthetic log data prevalence (15%).

In various embodiments, the similarity metric can depend on a function of the differences in the ratios between the synthetic dataset and the normalized reference dataset. For example, the actual dataset may include 10 rare values with a prevalence under 10% of the dataset. The difference between the prevalence of these 10 rare values in the actual dataset and the normalized reference dataset can range from −5% to 4%. In some embodiments, the similarity metric can depend on the greatest magnitude difference (e.g., the similarity metric could depend on the value −5% as the greatest magnitude difference). In various embodiments, the similarity metric can depend on the average of the magnitude differences, the Euclidean norm of the ratio differences, or the like.

In various embodiments, the similarity metric can depend on a difference in schemas between the synthetic dataset and the normalized reference dataset. For example, when the synthetic dataset includes spreadsheet data, system 100 can be configured to determine a number of mismatched columns between the synthetic and normalized reference datasets, a number of mismatched column types between the synthetic and normalized reference datasets, a number of mismatched column categories between the synthetic and normalized reference datasets, and number of mismatched numeric ranges between the synthetic and normalized reference datasets. The value of the similarity metric can depend on the number of at least one of the mismatched columns, mismatched column types, mismatched column categories, or mismatched numeric ranges.

In some embodiments, the similarity metric can depend on one or more of the above criteria. For example, the similarity metric can depend on one or more of (1) a covariance of the output data and a covariance of the normalized reference dataset a univariate value distribution of an element of the synthetic dataset, (2) a univariate value distribution of an element of the normalized reference dataset, (3) a number of elements of the synthetic dataset that match elements of the reference dataset, (4) a number of elements of the synthetic dataset that are similar to elements of the normalized reference dataset, (5) a distance measure between each row of the synthetic dataset (or a subset of the rows of the synthetic dataset) and each row of the normalized reference dataset (or a subset of the rows of the normalized reference dataset), (6) a frequency of duplicate elements in the synthetic dataset and the normalized reference dataset, (7) a relative prevalence of rare values in the synthetic and normalized reference dataset, and (8) differences in the ratios between the synthetic dataset and the normalized reference dataset.

System 100 can compare a synthetic dataset to a normalized reference dataset, a synthetic dataset to an actual (unnormalized) dataset, or to compare two datasets according to a similarity metric consistent with disclosed embodiments. For example, in some embodiments, model optimizer 107 can be configured to perform such comparisons. In various embodiments, model storage 105 can be configured to store similarity metric information (e.g., similarity values, indications of comparison datasets, and the like) together with a synthetic dataset.

Process 800 can then proceed to step 809. In step 809, system 100 (e.g., model optimizer 107, computational resources 101, or the like) can train the generative adversarial network using the similarity metric value. In some embodiments, system 100 can be configured to determine that the synthetic dataset satisfies a similarity criterion. The similarity criterion can concern at least one of the similarity metrics described above. For example, the similarity criterion can concern at least one of a statistical correlation score between the synthetic dataset and the normalized reference dataset, a data similarity score between the synthetic dataset and the reference dataset, or a data quality score for the synthetic dataset.

In some embodiments, synthetic data satisfying the similarity criterion can be too similar to the reference dataset. System 100 can be configured to update a loss function for training the generative adversarial network to decrease the similarity between the reference dataset and synthetic datasets generated by the generative adversarial network when the similarity criterion is satisfied. In particular, the loss function of the generative adversarial network can be configured to penalize generation of synthetic data that is too similar to the normalized reference dataset, up to a certain threshold. To that end, a penalty term can added to the loss function of the generative adversarial network. This term can penalize the calculated loss if the dissimilarity between the synthetic data and the actual data goes below a certain threshold. In some aspects, this penalty term can thereby ensure that the value of the similarity metric exceeds some similarity threshold, or remains near the similarity threshold (e.g., the value of the similarity metric may exceed 90% of the value of the similarity threshold) In this non-limiting example, decreasing values of the similarity metric can indicate increasing similarity. System 100 can then update the loss function such that the likelihood of generating synthetic data like the current synthetic data is reduced. In this manner, system 100 can train the generative adversarial network using a loss function that penalizes generation of data differing from the reference dataset by less than the predetermined amount.

Figure 9:
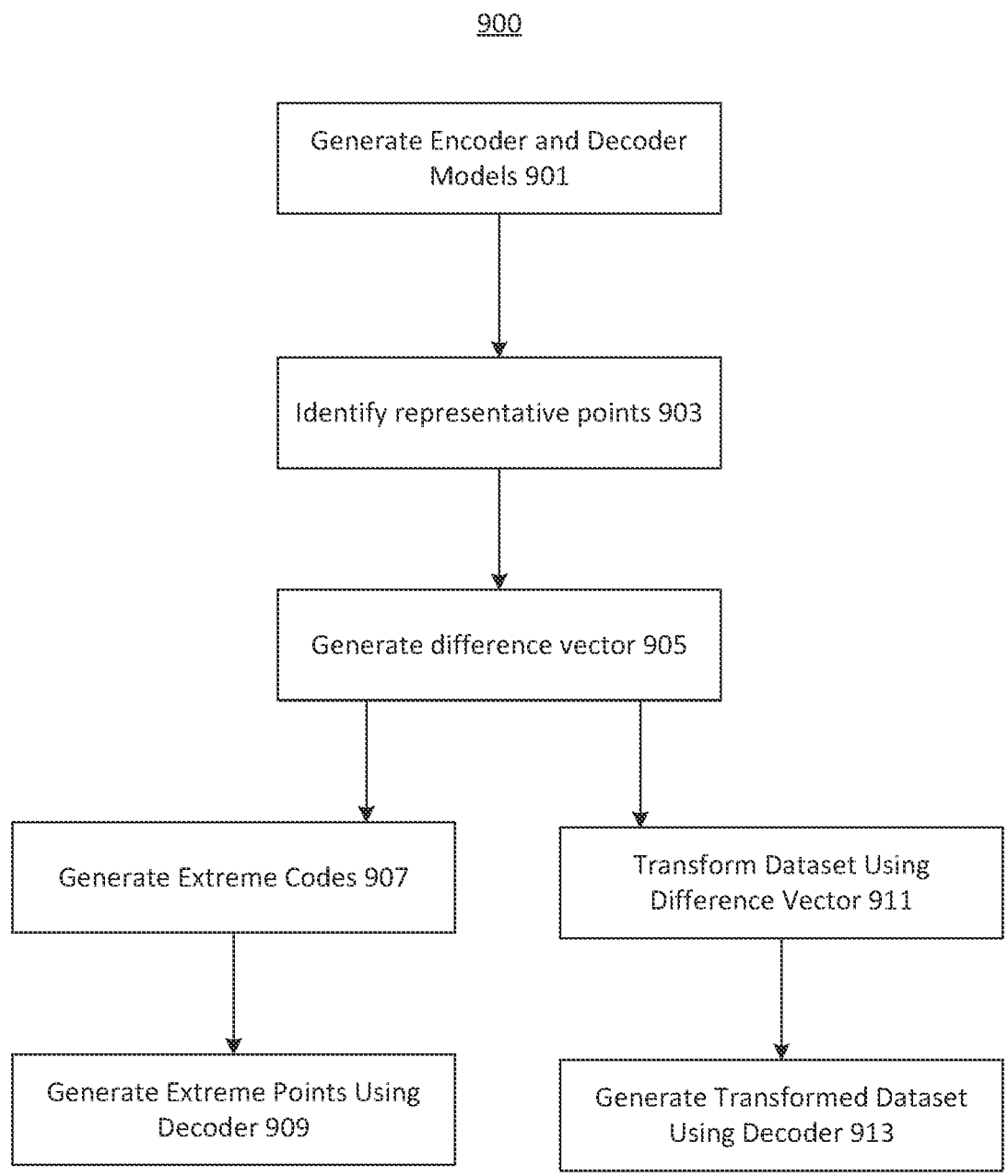
FIG. 9 depicts an exemplary process for supplementing or transforming datasets using code-space operations, consistent with disclosed embodiments.

FIG. 9 depicts a process 900 for supplementing or transforming datasets using code-space operations, consistent with disclosed embodiments. Process 900 can include the steps of generating encoder and decoder models that map between a code space and a sample space, identifying representative points in code space, generating a difference vector in code space, and generating extreme points or transforming a dataset using the difference vector. In this manner, process 900 can support model validation and simulation of conditions differing from those present during generation of a training dataset. For example, while existing systems and methods may train models using datasets representative of typical operating conditions, process 900 can support model validation by inferring datapoints that occur infrequently or outside typical operating conditions. As an additional example, a training data include operations and interactions typical of a first user population. Process 900 can support simulation of operations and interactions typical of a second user population that differs from the first user population. To continue this example, a young user population may interact with a system. Process 900 can support generation of a synthetic training dataset representative of an older user population interacting with the system. This synthetic training dataset can be used to simulate performance of the system with an older user population, before developing that userbase.

After starting, process 900 can proceed to step 901. In step 901, system 901 can generate an encoder model and a decoder model. Consistent with disclosed embodiments, system 100 can be configured to generate an encoder model and decoder model using an adversarially learned inference model, as disclosed in "Adversarially Learned Inference" by Vincent Dumoulin, et al. According to the adversarially learned inference model, an encoder maps from a sample space to a code space and a decoder maps from a code space to a sample space. The encoder and decoder are trained either by (1) selecting a code and generating a sample using the decoder or (2) by selecting a sample and generating a code using the encoder. The resulting pairs of code and sample are provided to a discriminator model, which is trained to determine whether the pairs of code and sample came from the encoder or decoder. The encoder and decoder can be updated based on whether the discriminator correctly determined the origin of the samples. Thus, the encoder and decoder can be trained to fool the discriminator. When appropriately trained, the joint distribution of code and sample for the encoder and decoder match. As would be appreciated by one of skill in the art, other techniques of generating a mapping from a code space to a sample space may also be used. For example, a generative adversarial network can be used to learn a mapping from the code space to the sample space.

Process 900 can then proceed to step 903. In step 903, system 100 can identify representative points in the code space. System 100 can identify representative points in the code space by identifying points in the sample space, mapping the identified points into code space, and determining the representative points based on the mapped points, consistent with disclosed embodiments. In some embodiments, the identified points in the sample space can be elements of a dataset (e.g., an actual dataset or a synthetic dataset generated using an actual dataset).

System 100 can identify points in the sample space based on sample space characteristics. For example, when the sample space includes financial account information, system 100 can be configured to identify one or more first accounts belonging to users in their 20s and one or more second accounts belonging to users in their 40s.

Consistent with disclosed embodiments, identifying representative points in the code space can include a step of mapping the one or more first points in the sample space and the one or more second points in the sample space to corresponding points in the code space. In some embodiments, the one or more first points and one or more second points can be part of a dataset. For example, the one or more first points and one or more second points can be part of an actual dataset or a synthetic dataset generated using an actual dataset.

System 100 can be configured to select first and second representative points in the code space based on the mapped one or more first points and the mapped one or more second points. As shown in FIG. 10A, when the one or more first points include a single point, the mapping of this single point to the code space (e.g., point 1001) can be a first representative point in code space 1000. Likewise, when the one or more second points include a single point, the mapping of this single point to the code space (e.g., point 1003) can be a second representative point in code space 1000.

As shown in FIG. 10B, when the one or more first points include multiple points, system 100 can be configured to determine a first representative point in code space 1010. In some embodiments, system 100 can be configured to determine the first representative point based on the locations of the mapped one or more first points in the code space. In some embodiments, the first representative point can be a centroid or a medoid of the mapped one or more first points. Likewise, system 100 can be configured to determine the second representative point based on the locations of the mapped one or more second points in the code space. In some embodiments, the second representative point can be a centroid or a medoid of the mapped one or more second points. For example, system 100 can be configured to identify point 1013 as the first representative point based on the locations of mapped points 1011a and 1011b. Likewise, system 100 can be configured to identify point 1017 as the second representative point based on the locations of mapped points 1015a and 1015b.

In some embodiments, the code space can include a subset of R''. System 100 can be configured to map a dataset to the code space using the encoder. System 100 can then identify the coordinates of the points with respect to a basis vector in R'' (e.g., one of the vectors of the identity matrix). System 100 can be configured to identify a first point with a minimum coordinate value with respect to the basis vector and a second point with a maximum coordinate value with respect to the basis vector. System 100 can be configured to identify these points as the first and second representative points. For example, taking the identity matrix as the basis, system 100 can be configured to select as the first point the point with the lowest value of the first element of the vector. To continue this example, system 100 can be configured to select as the second point the point with the highest value of the first element of the vector. In some embodiments, system 100 can be configured to repeat process 900 for each vector in the basis.

Process 900 can then proceed to step 905. In step 905, system 100 can determine a difference vector connecting the first representative point and the second representative point. For example, as shown in FIG. 10A, system 100 can be configured to determine a vector 1005 from first representative point 1101 to second representative point 1003. Likewise, as shown in FIG. 10B, system 100 can be configured to determine a vector 1019 from first representative point 1013 to second representative point 1017.

Figure 11A:
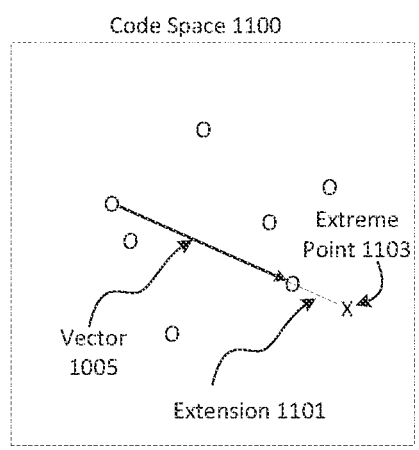
FIG. 11A depicts an exemplary illustration of supplementing datasets using code-space operations, consistent with disclosed embodiments.

Process 900 can then proceed to step 907. In step 907, as depicted in FIG. 11A, system 100 can generate extreme codes. Consistent with disclosed embodiments, system 100 can be configured to generate extreme codes by sampling the code space (e.g., code space 1200) along an extension (e.g., extension 1101) of the vector connecting the first representative point and the second representative point (e.g., vector 1005). In this manner, system 100 can generate a code extreme with respect to the first representative point and the second representative point (e.g. extreme point 1103).

Process 900 can then proceed to step 909. In step 909, as depicted in FIG. 11A, system 100 can generate extreme samples. Consistent with disclosed embodiments, system 100 can be configured to generate extreme samples by converting the extreme code into the sample space using the decoder trained in step 1001. For example, system 100 can be configured to convert extreme point 1203 into a corresponding datapoint in the sample space.

Figure 11B:
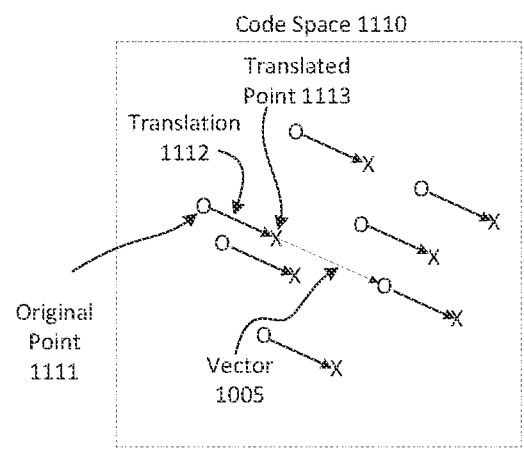
FIG. 11B depicts an exemplary illustration of transforming datasets using code-space operations, consistent with disclosed embodiments.

Process 900 can then proceed to step 911. In step 911, as depicted in FIG. 11B, system 100 can transform a dataset using the difference vector determined in step 905 (e.g., difference vector 1005). In some aspects, system 100 can be configured to convert the dataset from sample space to code space using the encoder trained in step 901. System 100 can be configured to then transform the elements of the dataset in code space using the difference vector. In some aspects, system 100 can be configured to transform the elements of the dataset using the vector and a scaling factor. In some aspects, the scaling factor can be less than one. In various aspects, the scaling factor can be greater than or equal to one. For example, as shown in FIG. 11B, the elements of the dataset can be transformed in code space 1110 by the product of the difference vector and the scaling factor (e.g., original point 1111 can be translated by transforming 1112 to transformed point 1113).

Process 900 can then proceed to step 913. In step 913, as depicted in FIG. 11B, system 100 can generate a transformed dataset. Consistent with disclosed embodiments, system 100 can be configured to generate the transformed dataset by converting the transformed points into the sample space using the decoder trained in step 901. For example, system 100 can be configured to convert extreme point translated point 1113 into a corresponding datapoint in the sample space.

Figure 12:
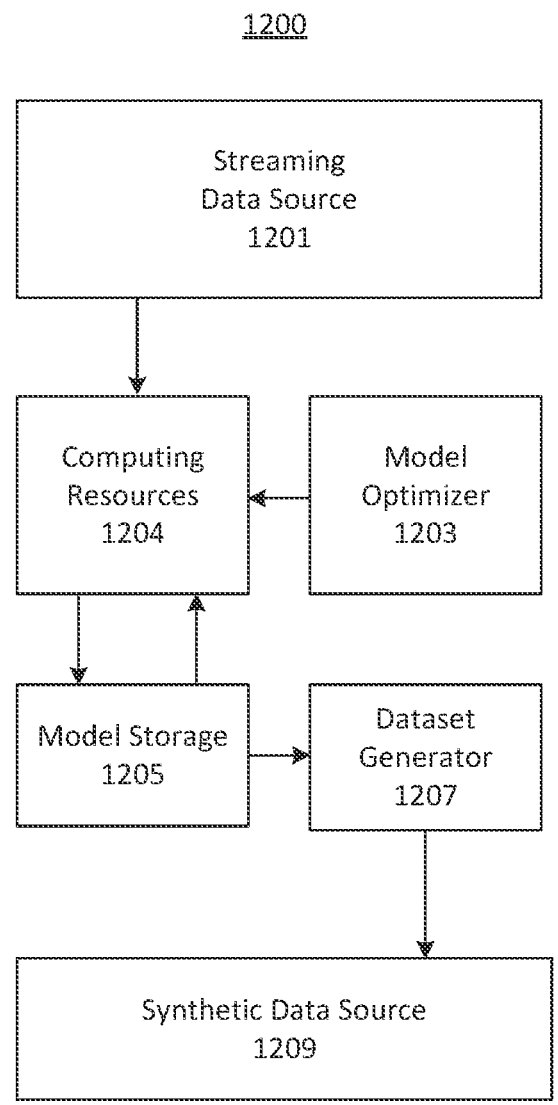
FIG. 12 depicts an exemplary cloud computing system for generating a synthetic data stream that tracks a reference data stream, consistent with disclosed embodiments.

FIG. 12 depicts an exemplary cloud computing system 1200 for generating a synthetic data stream that tracks a reference data stream. The flow rate of the synthetic data can resemble the flow rate of the reference data stream, as system 1200 can generate synthetic data in response to receiving reference data stream data. System 1200 can include a streaming data source 1201, a model optimizer 1203, a computing resource 1204, a model storage 1205, a dataset generator 1207, and a synthetic data source 1209. System 1200 can be configured to generate a new synthetic data model using actual data received from streaming data source 1301. Streaming data source 1201, model optimizer 1203, computing resources 1204, and model storage 1205 can interact to generate the new synthetic data model, consistent with disclosed embodiments. In some embodiments, system 1200 can be configured to generate the new synthetic data model while also generating synthetic data using a current synthetic data model.

Streaming data source 1201 can be configured to retrieve new data elements from a database, a file, a datasource, a topic in a data streaming platform (e.g., IBM STREAMS), a topic in a distributed messaging system (e.g., APACHE KAFKA), or the like. In some aspects, streaming data source 1201 can be configured to retrieve new elements in response to a request from model optimizer 1203. In some aspects, streaming data source 1201 can be configured to retrieve new data elements in real-time. For example, streaming data source 1201 can be configured to retrieve log data, as that log data is created. In various aspects, streaming data source 1201 can be configured to retrieve batches of new data. For example, streaming data source 1201 can be configured to periodically retrieve all log data created within a certain period (e.g., a five-minute interval). In some embodiments, the data can be application logs. The application logs can include event information, such as debugging information, transaction information, user information, user action information, audit information, service information, operation tracking information, process monitoring information, or the like. In some embodiments, the data can be JSON data (e.g., JSON application logs).

System 1200 can be configured to generate a new synthetic data model, consistent with disclosed embodiments. Model optimizer 1203 can be configured to provision computing resources 1204 with a data model, consistent with disclosed embodiments. In some aspects, computing resources 1204 can resemble computing resources 101, described above with regards to FIG. 1. For example, computing resources 1204 can provide similar functionality and can be similarly implemented. The data model can be a synthetic data model. The data model can be a current data model configured to generate data similar to recently received data in the reference data stream. The data model can be received from model storage 1205. For example, model optimizer 1207 can be configured to provide instructions to computing resources 1204 to retrieve a current data model of the reference data stream from model storage 1205. In some embodiments, the synthetic data model can include a recurrent neural network, a kernel density estimator, or a generative adversarial network.

Computing resources 1204 can be configured to train the new synthetic data model using reference data stream data. In some embodiments, system 1200 (e.g., computing resources 1204 or model optimizer 1203) can be configured to include reference data stream data into the training data as it is received from streaming data source 1201. The training data can therefore reflect the current characteristics of the reference data stream (e.g., the current values, current schema, current statistical properties, and the like). In some aspects, system 1200 (e.g., computing resources 1204 or model optimizer 1203) can be configured to store reference data stream data received from streaming data source 1201 for subsequent use as training data. In some embodiments, computing resources 1204 may have received the stored reference data stream data prior to beginning training of the new synthetic data model. As an additional example, computing resources 1204 (or another component of system 1200) can be configured to gather data from streaming data source 1201 during a first time-interval (e.g., the prior repeat) and use this gathered data to train a new synthetic model in a subsequent time-interval (e.g., the current repeat). In various embodiments, computing resources 1204 can be configured to use the stored reference data stream data for training the new synthetic data model. In various embodiments, the training data can include both newly-received and stored data. When the synthetic data model is a Generative Adversarial Network, computing resources 1204 can be configured to train the new synthetic data model, in some embodiments, as described above with regards to FIGS. 7 and 8. Alternatively, computing resources 1304 can be configured to train the new synthetic data model according to know methods.

Model optimizer 1203 can be configured to evaluate performance criteria of a newly created synthetic data model. In some embodiments, the performance criteria can include a similarity metric (e.g., a statistical correlation score, data similarity score, or data quality score, as described herein). For example, model optimizer 1203 can be configured to compare the covariances or univariate distributions of a synthetic dataset generated by the new synthetic data model and a reference data stream dataset. Likewise, model optimizer 1203 can be configured to evaluate the number of matching or similar elements in the synthetic dataset and reference data stream dataset. Furthermore, model optimizer 1203 can be configured to evaluate a number of duplicate elements in each of the synthetic dataset and reference data stream dataset, a prevalence of the most common value in synthetic dataset and reference data stream dataset, a maximum difference of rare values in each of the synthetic dataset and reference data stream dataset, differences in schema between the synthetic dataset and reference data stream dataset, and the like.

In various embodiments, the performance criteria can include prediction metrics. The prediction metrics can enable a user to determine whether data models perform similarly for both synthetic and actual data. The prediction metrics can include a prediction accuracy check, a prediction accuracy cross check, a regression check, a regression cross check, and a principal component analysis check. In some aspects, a prediction accuracy check can determine the accuracy of predictions made by a model (e.g., recurrent neural network, kernel density estimator, or the like) given a dataset. For example, the prediction accuracy check can receive an indication of the model, a set of data, and a set of corresponding labels. The prediction accuracy check can return an accuracy of the model in predicting the labels given the data. Similar model performance for the synthetic and original data can indicate that the synthetic data preserves the latent feature structure of the original data. In various aspects, a prediction accuracy cross check can calculate the accuracy of a predictive model that is trained on synthetic data and tested on the original data use to generate the synthetic data. In some aspects, a regression check can regress a numerical column in a dataset against other columns in the dataset, determining the predictability of the numerical column given the other columns. In some aspects, a regression error cross check can determine a regression formula for a numerical column of the synthetic data and then evaluate the predictive ability of the regression formula for the numerical column of the actual data. In various aspects, a principal component analysis check can determine a number of principal component analysis columns sufficient to capture a predetermined amount of the variance in the dataset. Similar numbers of principal component analysis columns can indicate that the synthetic data preserves the latent feature structure of the original data.

Model optimizer 1203 can be configured to store the newly created synthetic data model and metadata for the new synthetic data model in model storage 1205 based on the evaluated performance criteria, consistent with disclosed embodiments. For example, model optimizer 1203 can be configured to store the metadata and new data model in model storage when a value of a similarity metric or a prediction metrics satisfies a predetermined threshold. In some embodiments, the metadata can include at least one value of a similarity metric or prediction metric. In various embodiments, the metadata can include an indication of the origin of the new synthetic data model, the data used to generate the new synthetic data model, when the new synthetic data model was generated, and the like.

System 1200 can be configured to generate synthetic data using a current data model. In some embodiments, this generation can occur while system 1200 is training a new synthetic data model. Model optimizer 1203, model storage 1205, dataset generator 1207, and synthetic data source 1209 can interact to generate the synthetic data, consistent with disclosed embodiments.

Model optimizer 1203 can be configured to receive a request for a synthetic data stream from an interface (e.g., interface 113 or the like). In some aspects, model optimizer 1207 can resemble model optimizer 107, described above with regard to FIG. 1. For example, model optimizer 1207 can provide similar functionality and can be similarly implemented. In some aspects, requests received from the interface can indicating a reference data stream. For example, such a request can identify streaming data source 1201 and/or specify a topic or subject (e.g., a Kafka topic or the like). In response to the request, model optimizer 1207 (or another component of system 1200) can be configured to direct generation of a synthetic data stream that tracks the reference data stream, consistent with disclosed embodiments.

Dataset generator 1207 can be configured to retrieve a current data model of the reference data stream from model storage 1205. In some embodiments, dataset generator 1207 can resemble dataset generator 103, described above with regards to FIG. 1. For example, dataset generator 1207 can provide similar functionality and can be similarly implemented. Likewise, in some embodiments, model storage 1205 can resemble model storage 105, described above with regards to FIG. 1. For example, model storage 1205 can provide similar functionality and can be similarly implemented. In some embodiments, the current data model can resemble data received from streaming data source 1201 according to a similarity metric (e.g., a statistical correlation score, data similarity score, or data quality score, as described herein). In various embodiments, the current data model can resemble data received during a time interval extending to the present (e.g. the present hour, the present day, the present week, or the like). In various embodiments, the current data model can resemble data received during a prior time interval (e.g. the previous hour, yesterday, last week, or the like). In some embodiments, the current data model can be the most recently trained data model of the reference data stream.

Dataset generator 1207 can be configured to generate a synthetic data stream using the current data model of the reference data steam. In some embodiments, dataset generator 1207 can be configured to generate the synthetic data stream by replacing sensitive portions of the reference data steam with synthetic data, as described in FIGS. 4A and 4B. In various embodiments, dataset generator 1207 can be configured to generate the synthetic data stream without reference to the reference data steam data. For example, when the current data model is a recurrent neural network, dataset generator 1207 can be configured to initialize the recurrent neural network with a value string (e.g., a random sequence of characters), predict a new value based on the value string, and then add the new value to the end of the value string. Dataset generator 1207 can then predict the next value using the updated value string that includes the new value. In some embodiments, rather than selecting the most likely new value, dataset generator 1207 can be configured to probabilistically choose a new value. As a nonlimiting example, when the existing value string is "exam in" the dataset generator 1207 can be configured to select the next value as "e" with a first probability and select the next value as "a" with a second probability. As an additional example, when the current data model is a generative adversarial network or an adversarially learned inference network, dataset generator 1207 can be configured to generate the synthetic data by selecting samples from a code space, as described herein.

In some embodiments, dataset generator 1207 can be configured to generate an amount of synthetic data equal to the amount of actual data retrieved from synthetic data stream 1209. In some aspects, the rate of synthetic data generation can match the rate of actual data generation. As a nonlimiting example, when streamlining data source 1201 retrieves a batch of 10 samples of actual data, dataset generator 1207 can be configured to generate a batch of 10 samples of synthetic data. As a further nonlimiting example, when streamlining data source 1201 retrieves a batch of actual data every 10 minutes, dataset generator 1207 can be configured to generate a batch of actual data every 10 minutes. In this manner, system 1200 can be configured to generate synthetic data similar in both content and temporal characteristics to the reference data stream data.

In various embodiments, dataset generator 1207 can be configured to provide synthetic data generated using the current data model to synthetic data source 1209. In some embodiments, synthetic data source 1209 can be configured to provide the synthetic data received from dataset generator 1207 to a database, a file, a datasource, a topic in a data streaming platform (e.g., IBM STREAMS), a topic in a distributed messaging system (e.g., APACHE KAFKA), or the like.

As discussed above, system 1200 can be configured to track the reference data stream by repeatedly switching data models of the reference data stream. In some embodiments, dataset generator 1207 can be configured to switch between synthetic data models at a predetermined time, or upon expiration of a time interval. For example, model optimizer 1207 can be configured to switch from an old model to a current model every hour, day, week, or the like. In various embodiments, system 1200 can detect when a data schema of the reference data stream changes and switch to a current data model configured to provide synthetic data with the current schema. Consistent with disclosed embodiments, switching between synthetic data models can include dataset generator 1207 retrieving a current model from model storage 1205 and computing resources 1204 providing a new synthetic data model for storage in model storage 1205. In some aspects, computing resources 1204 can update the current synthetic data model with the new synthetic data model and then dataset generator 1207 can retrieve the updated current synthetic data model. In various aspects, dataset generator 1207 can retrieve the current synthetic data model and then computing resources 1204 can update the current synthetic data model with the new synthetic data model. In some embodiments, model optimizer 1203 can provision computing resources 1204 with a synthetic data model for training using a new set of training data. In various embodiments, computing resources 1204 can be configured to continue updating the new synthetic data model. In this manner, a repeat of the switching process can include generation of a new synthetic data model and the replacement of a current synthetic data model by this new synthetic data model.

Figure 13:
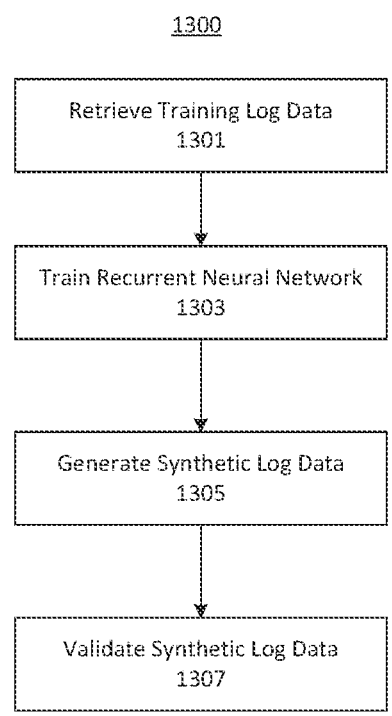
FIG. 13 depicts a process for generating synthetic JSON log data using the cloud computing system of FIG. 12, consistent with disclosed embodiments.

FIG. 13 depicts a process 1300 for generating synthetic JSON log data using the cloud computing system of FIG. 12. Process 1300 can include the steps of retrieving reference JSON log data, training a recurrent neural network to generate synthetic data resembling the reference JSON log data, generating the synthetic JSON log data using the recurrent neural network, and validating the synthetic JSON log data. In this manner system 1200 can use process 1300 to generate synthetic JSON log data that resembles actual JSON log data.

After starting, process 1300 can proceed to step 1301. In step 1301, substantially as described above with regards to FIG. 12, streaming data source 1201 can be configured to retrieve the JSON log data from a database, a file, a datasource, a topic in a distributed messaging system such Apache Kafka, or the like. The JSON log data can be retrieved in response to a request from model optimizer 1203. The JSON log data can be retrieved can be retrieved in real-time, or periodically (e.g., approximately every five minutes).

Process 1300 can then proceed to step 1303. In step 1303, substantially as described above with regards to FIG. 12, computing resources 1204 can be configured to train a recurrent neural network using the received data. The training of the recurrent neural network can proceed as described in "Training Recurrent Neural Networks," 2013, by Ilya Sutskever, which is incorporated herein by reference in its entirety.

Process 1300 can then proceed to step 1305. In step 1305, substantially as described above with regards to FIG. 12, dataset generator 1207 can be configured to generate synthetic JSON log data using the trained neural network. In some embodiments, dataset generator 1207 can be configured to generate the synthetic JSON log data at the same rate as actual JSON log data is received by streaming data source 1201. For example, dataset generator 1207 can be configured to generate batches of JSON log data at regular time intervals, the number of elements in a batch dependent on the number of elements received by streaming data source 1201. As an additional example, dataset generator 1207 can be configured to generate an element of synthetic JSON log data upon receipt of an element of actual JSON log data from streaming data source 1201.

Process 1300 can then proceed to step 1307. In step 1307, dataset generator 1207 (or another component of system 1200) can be configured to validate the synthetic data stream. For example, dataset generator 1207 can be configured to use a JSON validator (e.g., JSON SCHEMA VALIDATOR, JSONLINT, or the like) and a schema for the reference data stream to validate the synthetic data stream. In some embodiments, the schema describes key-value pairs present in the reference data stream. In some aspects, system 1200 can be configured to derive the schema from the reference data stream. In some embodiments, validating the synthetic data stream can include validating that keys present in the synthetic data stream are present in the schema. For example, when the schema includes the keys "first_name": {"type": "string" } and "last_name": {"type": "string" }, system 1200 may not validate the synthetic data stream when objects in the data stream lack the "first_name" and "last_name" keys. Furthermore, in some embodiments, validating the synthetic data stream can include validating that key-value formats present in the synthetic data stream match corresponding key-value formats in the reference data stream. For example, when the schema includes the keys "first_name": {"type": "string" } and "last_name": {"type": "string"}, system 1200 may not validate the synthetic data stream when objects in the data stream include a numeric-valued "first_name" or "last_name".

Figure 14:
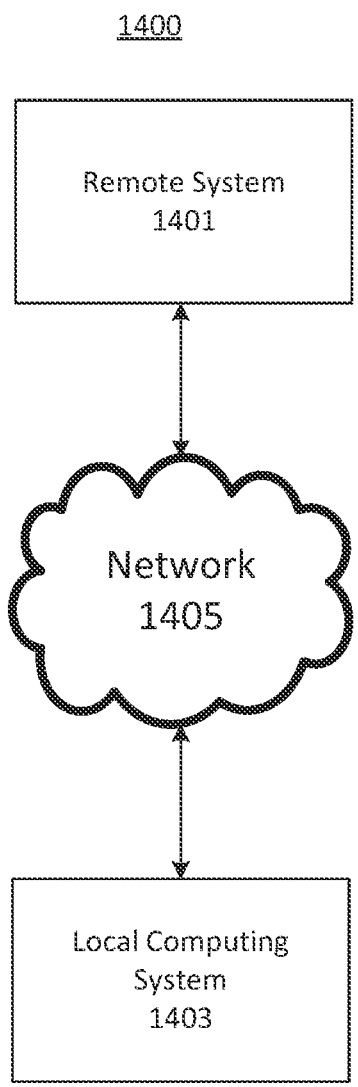
FIG. 14 depicts a system for secure generation and insecure use of models of sensitive data, consistent with disclosed embodiments.

FIG. 14 depicts a system 1400 for secure generation and insecure use of models of sensitive data. System 1400 can include a remote system 1401 and a local system 1403 that communicate using a network 1405. Remote system 1401 can be substantially similar to system 100. For example, remote system 1401 can include an interface, a model optimizer, and computing resources that resemble interface 113, model optimizer 107, and computing resources 101, respectively, described above with regards to FIG. 1. For example, the interface, model optimizer, and computing resources can provide similar functionality to interface 113, model optimizer 107, and computing resources 101, respectively, and can be similarly implemented. In some embodiments, remote system 1501 can be implemented using a cloud computing infrastructure. Local system 1403 can comprise a computing device, such as a smartphone, tablet, laptop, desktop, workstation, server, or the like. Network 1405 can include any combination of electronics communications networks enabling communication between components of system 1500 (similar to network 115).

In various embodiments, remote system 1401 can be more secure than local system 1403. For example, remote system 1401 can better protected from physical theft or computer intrusion than local system 1403. As a non-limiting example, remote system 1401 can be implemented using AWS or a private cloud of an institution and managed at an institutional level, while the local system can be in the possession of, and managed by, an individual user. In some embodiments, remote system 1401 can be configured to comply with policies or regulations governing the storage, transmission, and disclosure of customer financial information, patient healthcare records, or similar sensitive information. In contrast, local system 1403 may not be configured to comply with such regulations.

System 1400 can be configured to perform a process of generating synthetic data. According to this process, system 1400 can train the synthetic data model on sensitive data using remote system 1401, in compliance with regulations governing the storage, transmission, and disclosure of sensitive information. System 1400 can then transmit the synthetic data model to local system 1403, which can be configured to use the system to generate synthetic data locally. In this manner, local system 1403 can be configured to use synthetic data resembling the sensitive information, which comply with policies or regulations governing the storage, transmission, and disclosure of such information.

Consistent with this process, the model optimizer can receive a data model generation request from the interface. In response to the request, the model optimizer can provision computing resources with a synthetic data model. The computing resources can train the synthetic data model using a sensitive dataset (e.g., consumer financial information, patient healthcare information, or the like). The model optimizer can be configured to evaluate performance criteria of the data model (e.g., the similarity metric and prediction metrics described herein, or the like). Based on the evaluation of the performance criteria of the synthetic data model, the model optimizer can be configured to store the trained data model and metadata of the data model (e.g., values of the similarity metric and prediction metrics, of the data, the origin of the new synthetic data model, the data used to generate the new synthetic data model, when the new synthetic data model was generated, and the like). For example, the model optimizer can determine that the synthetic data model satisfied predetermined acceptability criteria based on one or more similarity and/or prediction metric value.

Local system 1403 can then retrieve the synthetic data model from remote system 1401. In some embodiments, local system 1403 can be configured to retrieve the synthetic data model in response to a synthetic data generation request received by local system 1403. For example, a user can interact with local system 1403 to request generation of synthetic data. In some embodiments, the synthetic data generation request can specify metadata criteria for selecting the synthetic data model. Local system 1403 can interact with remote system 1401 to select the synthetic data model based on the metadata criteria. Local system 1403 can then generate the synthetic data using the data model in response to the data generation request.

Figure 15:
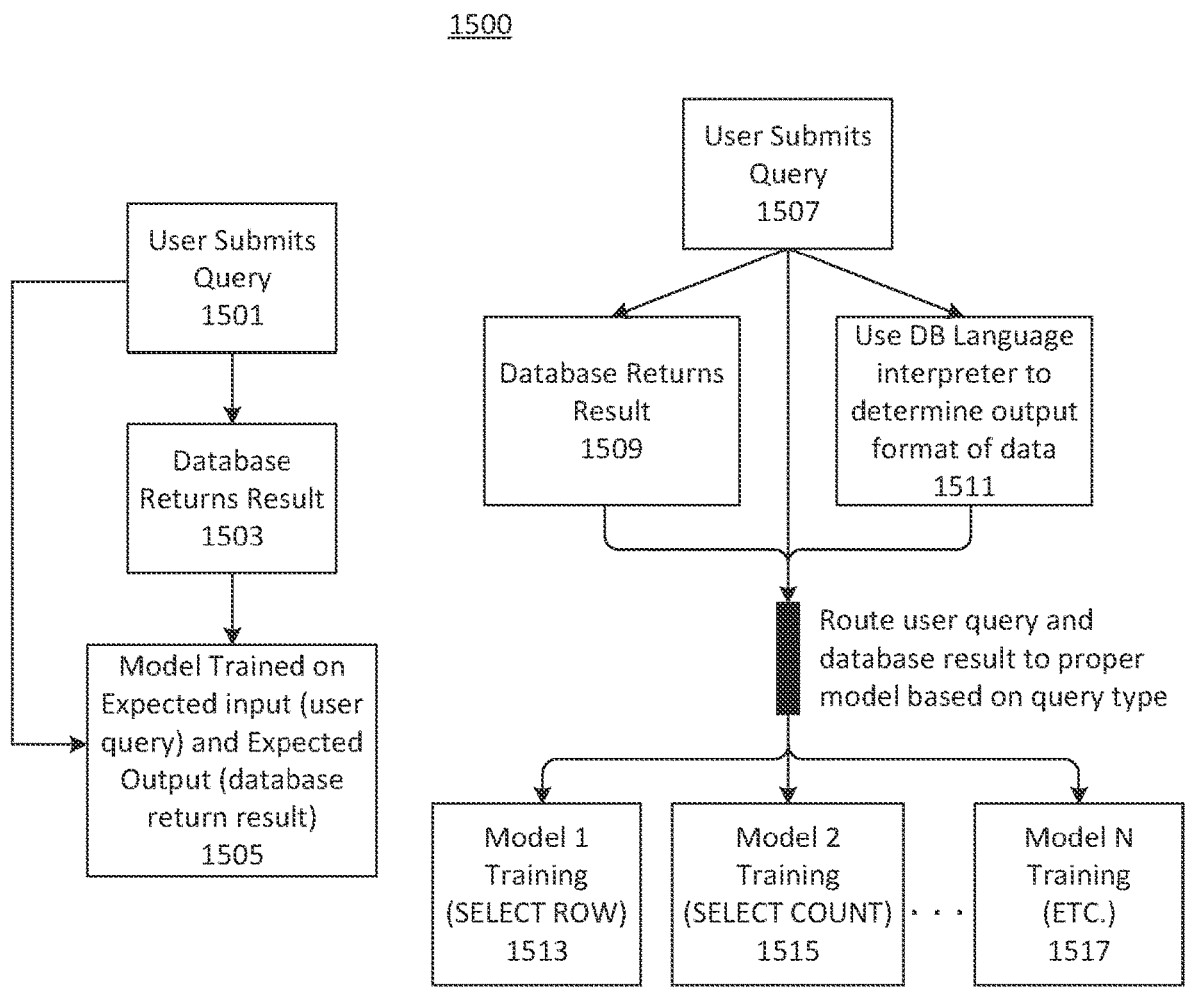
FIG. 15 depicts an exemplary process for training a plurality of models based on query input, consistent with disclosed embodiments.

Referring now to FIG. 15, there is shown a flow chart of a process 1500 for training a plurality of models based on query input, consistent with disclosed embodiments. In some embodiments, process 1500 may be executed in a cloud-computing environment 100 by computing resources 101, dataset generator 103, database 105, and model optimizer 107.

At step 1501 in cloud-computing environment 100 (FIG. 1), a first query input may be received at a first user interface. A processor may determine, based on natural language processing, a type of the query input. The query input may include a character string. As a particular example, query input may include sensitive data including customer financial information. As another example, query input may include a search string related to healthcare criteria, as discussed above. Other example types of query input and sensitive data are contemplated.

At step 1503, database 105 may return, based on an output data format, a first result based on the data in the database in response to the query input. Synthetic data may be generated as raw text as a field to generate the first result. At step 1503, database 105 may ingest data for structured data formats (e.g., CSV, TSV), semi-structured data formats (e.g., JSON, Parquet, Avro), and may also return or generate synthetic query data for said formats as a first result in response to a query input.

At step 1505, model optimizer 107 may train a plurality of models based on an expected input and expected output.

Training may include training models to generate output data differing at least a predetermined amount from a reference dataset according to a similarity metric. The expected input may include predetermined input data, and the expected output may include predetermined output data. A similarity metric may include a value or an amount indicative of how similar output data is to a reference dataset. The expected input may include a user query, and the expected output may include a database return result output in step 1503. Model optimizer 107 may evaluate performance criteria of the plurality of training models. Varied performance criteria, data, and thresholds may be contemplated. Model optimizer 107 may generate, with dataset generator 103, a synthetic dataset for training a generation model using a generative network of a generative adversarial network, the generative network being trained to generate output data differing at least a predetermined amount from a reference dataset according to a similarity metric.

At step 1507, which may be performed in cloud-computing environment 100 (FIG. 1), a second query input may be received at a second user interface. A processor may determine, based on natural language processing, a type of the query input. The query input type may, for example, be "SELECT or COUNT." or any other character string. The query input may include exemplary sensitive data including customer financial information, as discussed above. Other types of query input and data are contemplated.

At step 1509, database 105 may return a second result. Model optimizer 107 may generate, with dataset generator 103, a synthetic dataset for training the generation model using a generative network of a generative adversarial network, the generative network trained to generate output data differing at least a predetermined amount from a reference dataset according to a similarity metric. Data may be generated for raw text. Database 105 may ingest data for structured data formats (e.g., CSV, TSV), semi-structured data formats (e.g., JSON, Parquet, Avro), and may also return or generate synthetic query data for said formats as a second result in response to a query input. Model optimizer 107 may also extract information from the generation model and may view the extracted information on a user interface.

At step 1511, a database (DB) language interpreter may be coupled with a query type and used to determine an output format of data. For example, DB language interpreter may determine or interpret the language associated with the user submitted query in order to determine an output format of data at step 1511. At steps 1513, 1515, and 1517, a user query and database result may be routed to each of training model 1, training model 2, or training model N based on query type. SELECT ROW 1513 and SELECT COUNT 1515 may produce different output formats and therefore would likely require different models to represent them based on the data they are representing. The user query and database result may also be routed to a single training model selected from the plurality of training models. Model optimizer 107 may train a recurrent neural network (RNN) or a generative adversarial network (GAN) to synthetically generate results in response to an input query from a user. Seq2seq models may encode the query and the encoding may be input to either a GAN or RNN. These results may then be utilized to train models 1513, 1515, and 1517.

Figure 16:
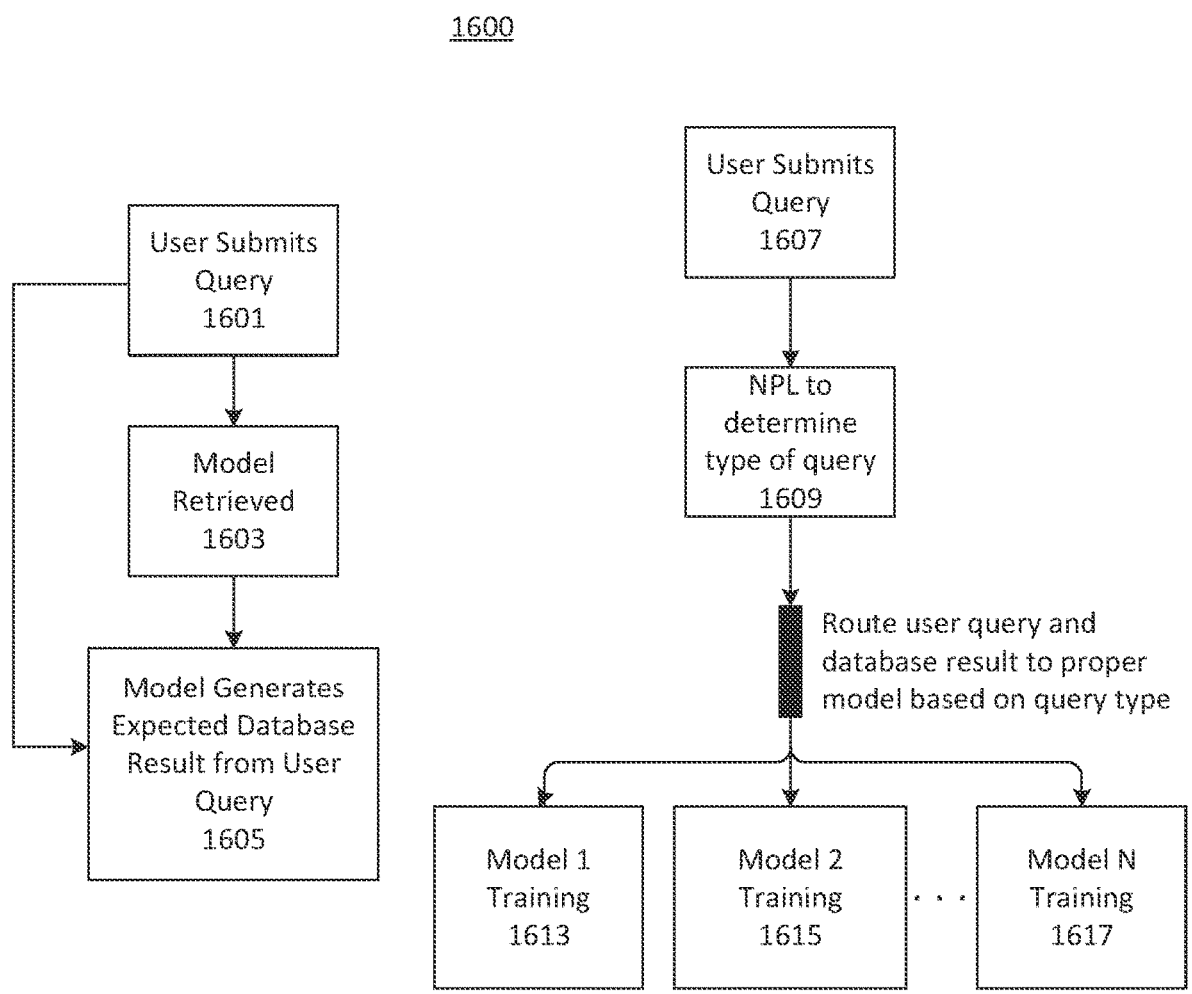
FIG. 16 depicts an exemplary process for generating synthetic results based on query input, consistent with disclosed embodiments.

Referring now to FIG. 16, there is shown a flow chart of a process 1600 for generating synthetic results based on query input, consistent with disclosed embodiments. In some embodiments, process 1600 may be executed in a cloud-computing environment 100 by computing resources 101, dataset generator 103, database 105, and model optimizer 107.

At step 1601, which may be performed by one or more elements of cloud-computing environment 100 (FIG. 1), a first query input at a first user interface may be received. A processor may determine a type of the query input. The query input may include a character string. The query input may include sensitive data including customer financial information. Other types of query input and data are contemplated.

At step 1603, model optimizer 107 may return an optimized model for analyzing the query. The optimized model may be determined based on the type of the query input. As discussed in step 1503, a database returns a result and a model trained at 1505, 1513, 1515, and 1517 (see FIG. 15). Accordingly, at step 1603, one of training models 1505, 1513, 1515, or 1517 may be retrieved.

At step 1605, model optimizer 107 executing the optimized model may generate an expected database result based on the user query. The expected database result may include a synthetic database return result. The synthetic data may be generated for raw text. Model optimizer 107 may automatically detect sensitive portions of structured and unstructured datasets and may automatically replace the datasets with synthetic values. Model optimizer 107 may also extract information from the generation model and may view the extracted information on a user interface.

At step 1607, cloud-computing environment 100 (FIG. 1) may include a user submitting a second query. The second query may be used for the routing process for both training and for output of results. A determination relating to what to train may be made based on the results at step 1605. Or if there exists no training, environment 100 may determine which model to produce the result for the query. Second query input may be received at a second user interface.

At step 1609, a processor may determine, based on natural language processing, a type of the query input. The query input may include a character string. The query input may include sensitive data including customer financial information. Other types of query input and data are contemplated. At step 1609, model optimizer 107 may utilize natural processing language to determine the type of query input. At steps 1613, 1615, and 1617, the user query and real database result may be routed to each of training model 1, training model 2, or training model N based on query type. The user query may also be routed to a single training model selected from the plurality of training models. Model optimizer 107 may train a recurrent neural network or a generative adversarial network to synthetically generate results used for training models 1613, 1615, and 1617 in response to an input query.

Figure 17:
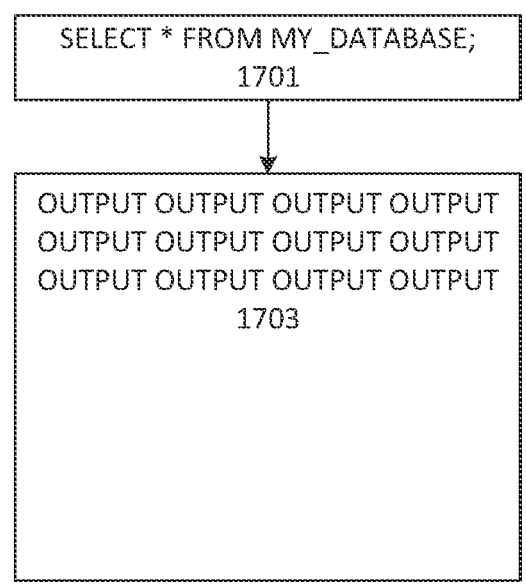
FIG. 17 depicts a flow chart of an exemplary process 1800 for interacting with a user interface for outputting synthetic query results, consistent with disclosed embodiments.

Referring now to FIG. 17, there is shown a flow chart of an exemplary process 1700 for interacting with a user interface for outputting synthetic query results, consistent with disclosed embodiments. In some embodiments, process 1700 may be executed in a cloud-computing environment 100 by computing resources 101, dataset generator 103, database 105, and model optimizer 107.

At step 1701, a command of SELECT*FROM MY_DATABASE may be submitted by a user at a first user interface and may be executed by computing resources 101 to output synthetic query results. The execution may proceed in accordance with the exemplary processes 1500 and 1600 (as shown in FIGS. 15 and 16). At step 1703, a graphical user interface may finally display the synthetic results generated in response to the query input from a user. As shown in FIG.

17, the output may take a format 1703 including for example a character string "OUTPUT". Other output formats displaying results are contemplated. For example, output strings may be displayed on a screen of a mobile device, tablet, or handheld device, and may provide an answer to the initial query input. The OUTPUT may be in alphanumeric form and may be displayed in the form of a sentence or numeric results.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples, but instead are defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system for generating synthetic results based on a query input, comprising:
    one or more processors and memories storing instructions that, when executed by the one or more processors, cause operations comprising:
        in response to a user interaction, with a user interface, involving a query input, inputting the query input into a natural language processing model to derive a type of the query input;
        routing, via a network, based on the type of the query input, the query input to a trained model of a plurality of models, wherein the trained model is trained to generate synthetic values for a selected subclass within a class and not for other subclasses within the class; and
        based on the routing of the query input to the trained model, inputting the query input to the trained model to generate a subclass-specific synthetic dataset that satisfies a statistical similarity criterion associated with both the synthetic dataset and a reference dataset, wherein the statistical similarity criterion is one or more of a statistical correlation score between the synthetic dataset and the reference dataset, a data similarity score between the synthetic dataset and the reference dataset, or a data quality score for the synthetic dataset.

2. The system of claim 1, the operations further comprising:
    returning, via a network, based on the subclass-specific synthetic dataset, one or more synthetic query results.

3. The system of claim 1, the operations further comprising:
    retrieving, from a network database, a data record comprising one or more record portions and one or more sensitive record portions; and
    returning, via a network, based on the data record and the subclass-specific synthetic dataset, one or more synthetic query results comprising (i) the one or more record portions without the one or more sensitive record portions and (ii) one or more synthetic data portions of the subclass-specific synthetic dataset in lieu of the one or more sensitive record portions.

4. The system of claim 1, wherein routing the query input to the trained model comprises inputting one or more query portions of the query input to a classifier model to determine the selected subclass and, based on the selected subclass and the type of the query input, routing the query input to the trained model.

5. The system of claim 1, wherein the statistical similarity criterion comprises a statistical correlation score between the synthetic dataset and the reference dataset.

6. The system of claim 1, wherein the trained model comprises a neural network, recurrent neural network, generative adversarial network, kernel density estimator, or random value generator.

7. A method comprising:
    executing, via one or more processors, operations comprising:
        based on a user interaction, with a user interface, involving a query input, inputting the query input into a natural language processing model to derive a type of the query input;
        routing, via a network, based on the type of the query input, the query input to a trained model that is trained to generate synthetic values for a selected subclass within a class and not for other subclasses within the class; and
        based on the routing of the query input to the trained model, inputting the query input to the trained model to generate a subclass-specific synthetic dataset that satisfies a statistical similarity criterion associated with both the synthetic dataset and a reference dataset, wherein the statistical similarity criterion comprises one or more of a statistical correlation score between the synthetic dataset and the reference dataset, a data similarity score between the synthetic dataset and the reference dataset, or a data quality score for the synthetic dataset.

8. The method of claim 7, the operations further comprising:
    returning, via a network, based on the subclass-specific synthetic dataset, one or more synthetic query results.

9. The method of claim 7, the operations further comprising:
    retrieving, from a network database, a data record comprising one or more record portions and one or more sensitive record portions; and
    returning, via a network, based on the data record and the subclass-specific synthetic dataset, one or more synthetic query results comprising (i) the one or more record portions without the one or more sensitive record portions and (ii) one or more synthetic data portions of the subclass-specific synthetic dataset in lieu of the one or more sensitive record portions.

10. The method of claim 7, the operations wherein routing the query input to the trained model comprises inputting one or more query portions of the query input to a classifier model to determine the selected subclass and, based on the selected subclass and the type of the query input, routing the query input to the trained model.

11. The method of claim 7, wherein the statistical similarity criterion comprises a statistical correlation score between the synthetic dataset and the reference dataset.

12. The method of claim 7, wherein the statistical similarity criterion comprises a data similarity score between the synthetic dataset and the reference dataset.

13. The method of claim 7, wherein the trained model comprises a neural network, recurrent neural network, generative adversarial network, kernel density estimator, or random value generator.

14. One or more non-transitory computer-readable media storing instructions that, when executed by one or more processors, cause operations comprising:
based on a user interaction, with a user interface, involving a query input, inputting the query input into a natural language processing model to derive a type of the query input;
routing, via a network, based on the type of the query input, the query input to a trained model that is trained to generate synthetic values for a selected subclass within a class and not for other subclasses within the class; and
based on the routing of the query input to the trained model, inputting the query input to the trained model to generate a subclass-specific synthetic dataset that satisfies a statistical similarity criterion associated with both the synthetic dataset and a reference dataset, wherein the statistical similarity criterion comprises one or more of a statistical correlation score between the synthetic dataset and the reference dataset, a data similarity score between the synthetic dataset and the reference dataset, or a data quality score for the synthetic dataset.

15. The one or more non-transitory computer-readable media of claim 14, the operations further comprising:
returning, via a network, based on the subclass-specific synthetic dataset, one or more synthetic query results.

16. The one or more non-transitory computer-readable media of claim 14, the operations further comprising:
retrieving, from a network database, a data record comprising one or more record portions and one or more sensitive record portions; and
returning, via a network, based on the data record and the subclass-specific synthetic dataset, one or more synthetic query results comprising (i) the one or more record portions without the one or more sensitive record portions and (ii) one or more synthetic data portions of the subclass-specific synthetic dataset in lieu of the one or more sensitive record portions.

17. The one or more non-transitory computer-readable media of claim 14, the operations wherein routing the query input to the trained model comprises inputting one or more query portions of the query input to a classifier model to determine the selected subclass and, based on the selected subclass and the type of the query input, routing the query input to the trained model.

18. The one or more non-transitory computer-readable media of claim 14, wherein the statistical similarity criterion comprises a statistical correlation score between the synthetic dataset and the reference dataset.

19. The one or more non-transitory computer-readable media of claim 14, wherein the statistical similarity criterion comprises a data similarity score between the synthetic dataset and the reference dataset.

20. The one or more non-transitory computer-readable media of claim 14, wherein the trained model comprises a neural network, recurrent neural network, generative adversarial network, kernel density estimator, or random value generator.

* * * * *